United States Patent
Kilian et al.

(10) Patent No.: US 10,574,501 B2
(45) Date of Patent: Feb. 25, 2020

(54) OPTIMIZED PREAMBLE AND METHOD FOR INTERFERENCE ROBUST PACKET DETECTION FOR TELEMETRY APPLICATIONS

(71) Applicants: Fraunhofer-Gesellschaft zur Förderung der angewandten Forschung e.V., München (DE); Friedrich-Alexander-Universitaet Erlangen-Nuernberg, Erlangen (DE)

(72) Inventors: Gerd Kilian, Erlangen (DE); Josef Bernhard, Nabburg (DE); Jörg Robert, Uttenreuth (DE); Jakob Kneißl, Fürth (DE)

(73) Assignee: FRAUNHOFER-GESELLSCHAFT ZUR FÖRDERUNG DER ANGEWANDTEN FORSCHUNG E.V., Erlangen (DE)

( * ) Notice: Subject to any disclaimer, the term of this patent is extended or adjusted under 35 U.S.C. 154(b) by 0 days.

(21) Appl. No.: 16/140,846

(22) Filed: Sep. 25, 2018

(65) Prior Publication Data
US 2019/0036757 A1    Jan. 31, 2019

Related U.S. Application Data

(63) Continuation of application No. PCT/EP2016/057014, filed on Mar. 31, 2016.

(51) Int. Cl.
*H04L 27/26* (2006.01)
*H04L 5/00* (2006.01)
(Continued)

(52) U.S. Cl.
CPC ........ *H04L 27/2659* (2013.01); *H04L 5/0048* (2013.01); *H04L 27/2656* (2013.01);
(Continued)

(58) Field of Classification Search
CPC ............... H04L 27/2659; H04L 5/0048; H04L 27/2675; H04L 27/2691; H04L 27/2692
See application file for complete search history.

(56) References Cited

U.S. PATENT DOCUMENTS

| 5,579,338 A | 11/1996 | Kojima |
| 10,039,084 B2 | 7/2018 | Bernhard et al. |

(Continued)

FOREIGN PATENT DOCUMENTS

| CN | 1989724 A | 6/2007 |
| DE | 102011082098 A1 | 3/2013 |

(Continued)

OTHER PUBLICATIONS

5. R. De Gaudenzi, F Giannetti, and M. Luise, "Signal recognition and signature code acquisition in CDMA mobile packet communications," IEEE Transactions on Vehicular Technnology, vol. 47, No. 1, pp. 196-208, Feb. 1998.

(Continued)

*Primary Examiner* — Kabir A Timory
(74) *Attorney, Agent, or Firm* — McClure, Qualey & Rodack, LLP

(57) ABSTRACT

Embodiments provide a receiver having a receiving unit and a synchronization unit. The receiving unit is configured to receive a data packet having a pilot sequence. The synchronization unit is configured to separately correlate the pilot sequence with at least two partial reference sequences corresponding to a reference sequence for the pilot sequence of the data packet, in order to obtain a partial correlation result for each of the at least two partial reference sequences, wherein the synchronization unit is configured to non-coherently add the partial correlation results in order to obtain a coarse correlation result for the data packet.

31 Claims, 18 Drawing Sheets

(51) Int. Cl.
*H04B 1/7075* (2011.01)
*H04L 7/04* (2006.01)
*H04L 7/10* (2006.01)

(52) U.S. Cl.
CPC ...... *H04L 27/2675* (2013.01); *H04L 27/2691* (2013.01); *H04L 27/2692* (2013.01); *H04B 1/70752* (2013.01); *H04L 7/042* (2013.01); *H04L 7/10* (2013.01); *H04L 27/2613* (2013.01)

(56) References Cited

U.S. PATENT DOCUMENTS

| | | |
|---|---|---|
| 2005/0002442 A1 | 1/2005 | Litwin et al. |
| 2006/0153322 A1 | 7/2006 | Varikat et al. |
| 2007/0153761 A1 | 7/2007 | Fechtel |
| 2009/0190704 A1 | 7/2009 | Ben-Ari et al. |
| 2009/0232051 A1 | 9/2009 | Swarts et al. |
| 2012/0087447 A1 | 4/2012 | Yoon et al. |
| 2016/0013925 A1* | 1/2016 | Ma .................. H04B 7/022 370/329 |
| 2016/0366649 A1 | 12/2016 | Bernhard et al. |

FOREIGN PATENT DOCUMENTS

| | | |
|---|---|---|
| EP | 2914039 | 9/2015 |
| JP | 2005-500737 A | 1/2005 |
| JP | 2007-531330 A | 11/2007 |
| JP | 2012-507719 A | 3/2012 |
| KR | 10-2012-0036018 A | 4/2012 |
| WO | 9602991 A1 | 2/1996 |
| WO | 0030271 A1 | 5/2000 |
| WO | 03/017551 A2 | 2/2003 |
| WO | 2005/002314 A2 | 1/2005 |
| WO | 2010/062606 A1 | 6/2010 |
| WO | 2013/030303 A2 | 3/2013 |
| WO | 2015/053947 A1 | 4/2015 |
| WO | 2015/128385 A1 | 9/2015 |

OTHER PUBLICATIONS

6. F. J. Block and E. W. Huang, "Packet Acquisition Performance of Frequency-Hop Spread-Spectrum Systems in Partial-Band Interference," in IEEE Military Communications Conference, 2007. MILCOM 2007, 2007, pp. 1-7.
https://upload.wikimedia.org/wikipedia/commons/e/e3/Barker7corr.svg (printed Nov. 22, 2018).
International Search Report and written opinion dated Jan. 17, 2017, issued in application No. PCT/EP2016/057014.
Kilian, et al.: "Increasing Transmission Reliability for Telemetry Systems Using Telegram Splitting"; IEEE Transactions on Communications, vol. 63, No. 3, Mar. 2015; pp. 1-14.
Kilian, et al.: "Improved Coverage for Low-Power Telemetry Systems using Telegram Splitting"; Smart SysTech, Jun. 11-12, 2013 in Erlangen/Nuremberg, Germany; pp. 1-6.
Korean language office action dated Nov. 19, 2019, issued in application No. KR 10-2018-7031679, and its English language translation.
Japanese language office action dated Nov. 12, 2019, issued in application No. JP 2019-502139, and its translation.

* cited by examiner autocorrelation function of Barker-7 code

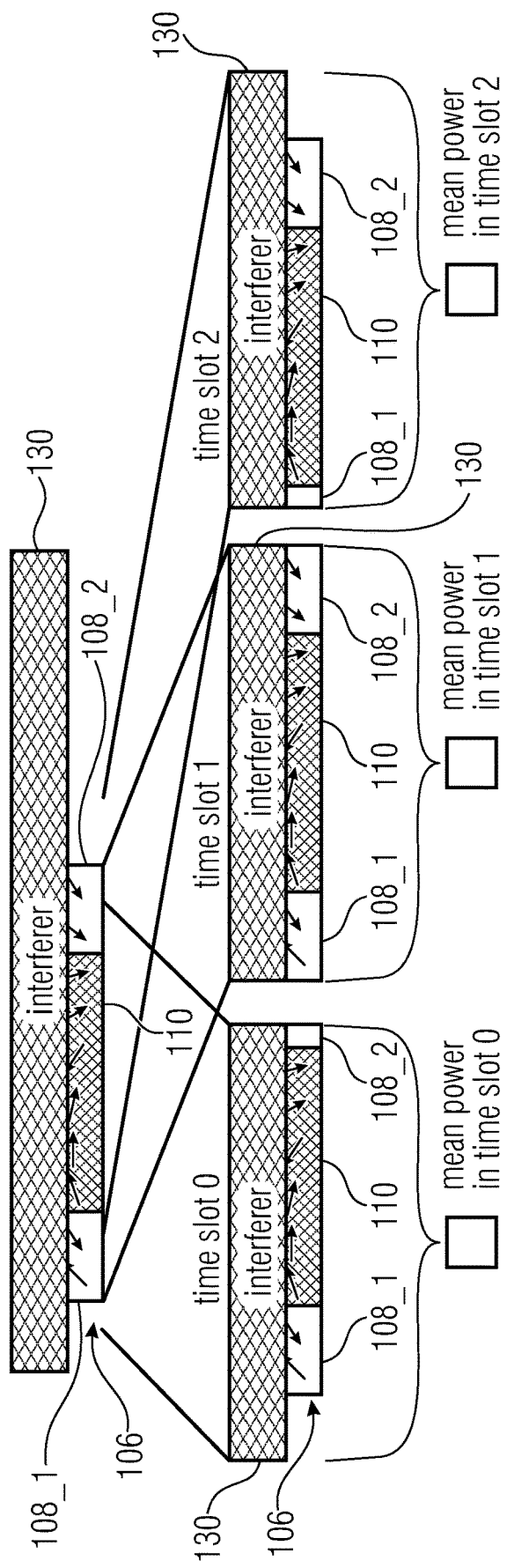
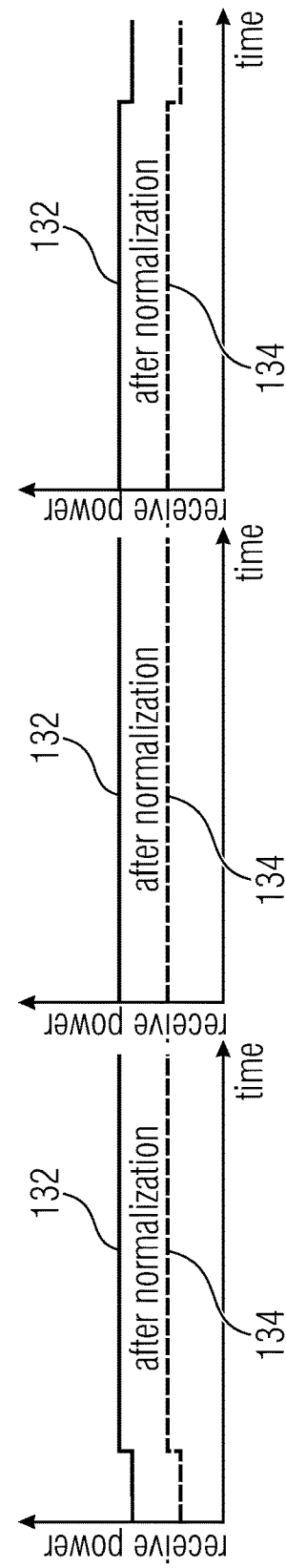
Fig. 7a
Fig. 7b

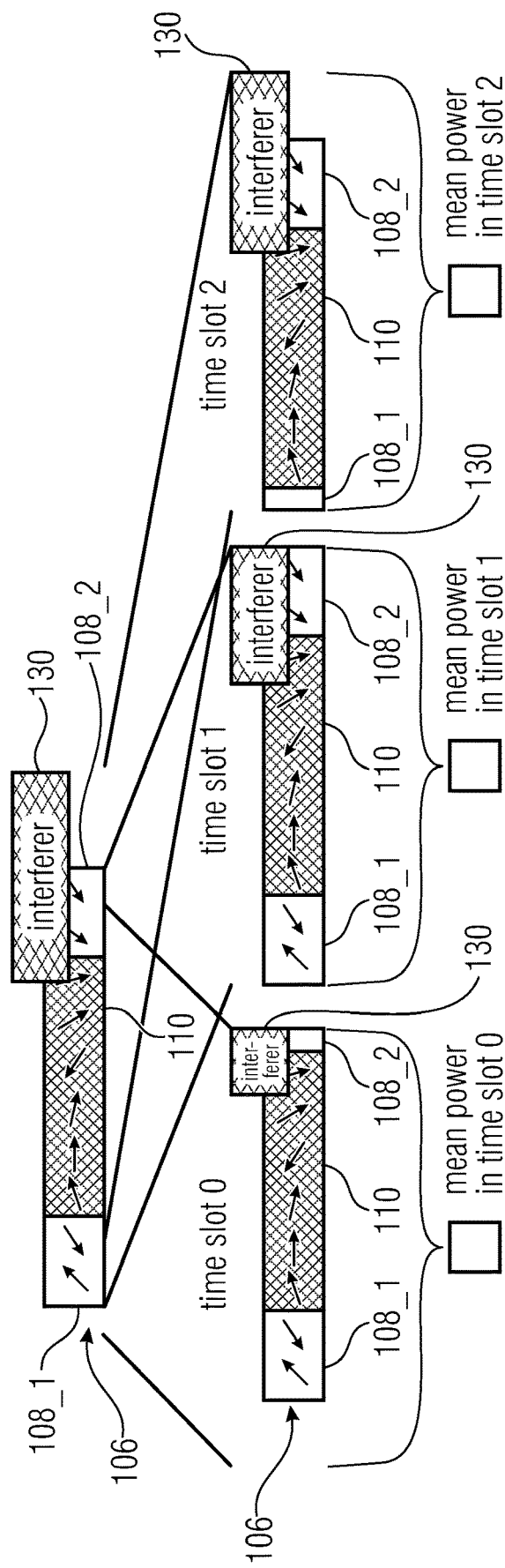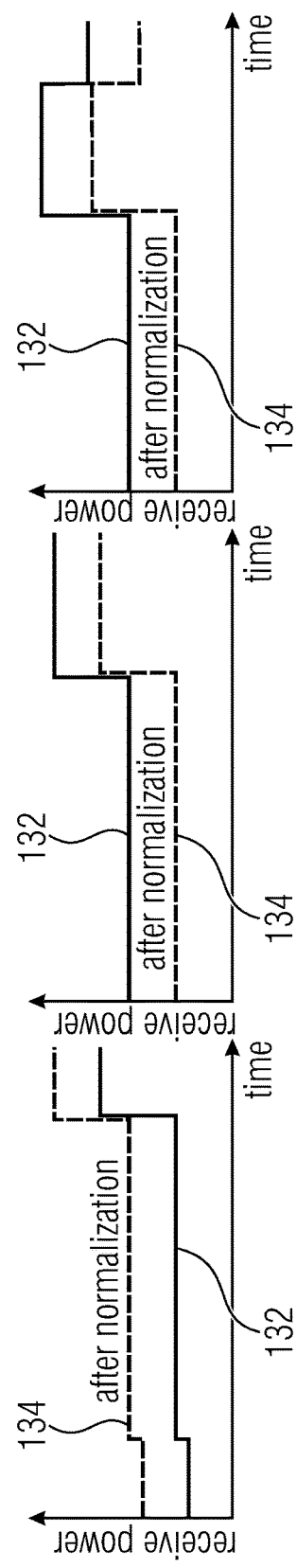
Fig. 8a
Fig. 8b

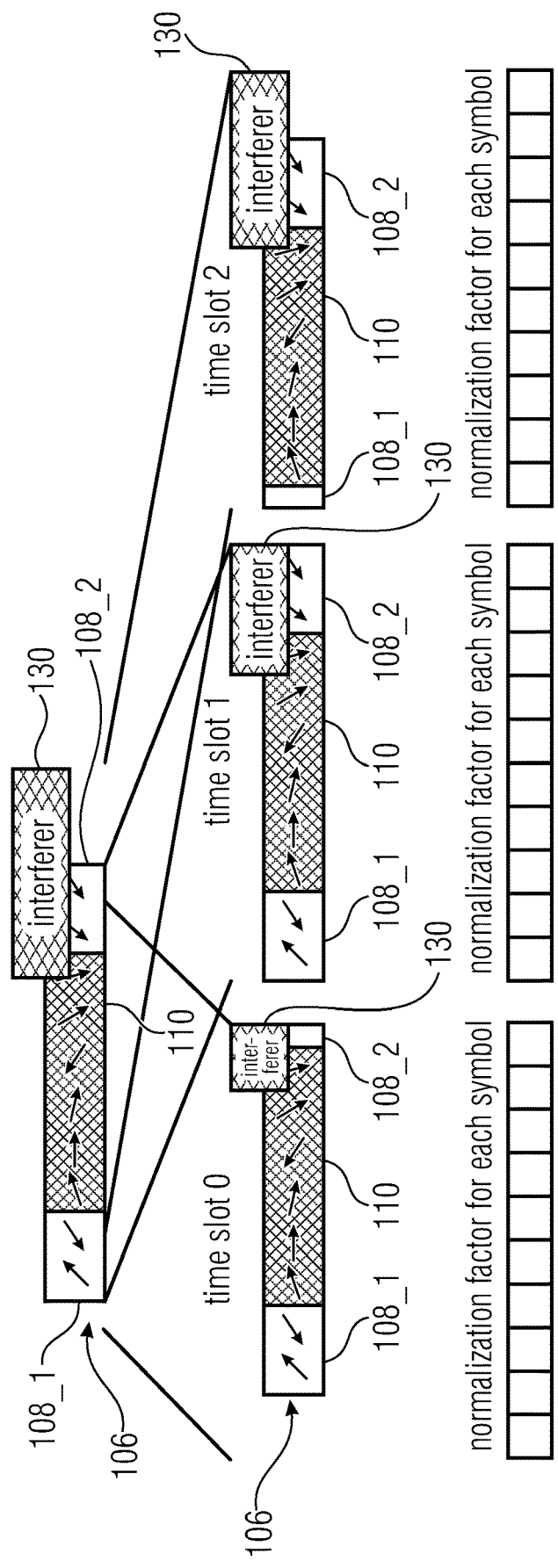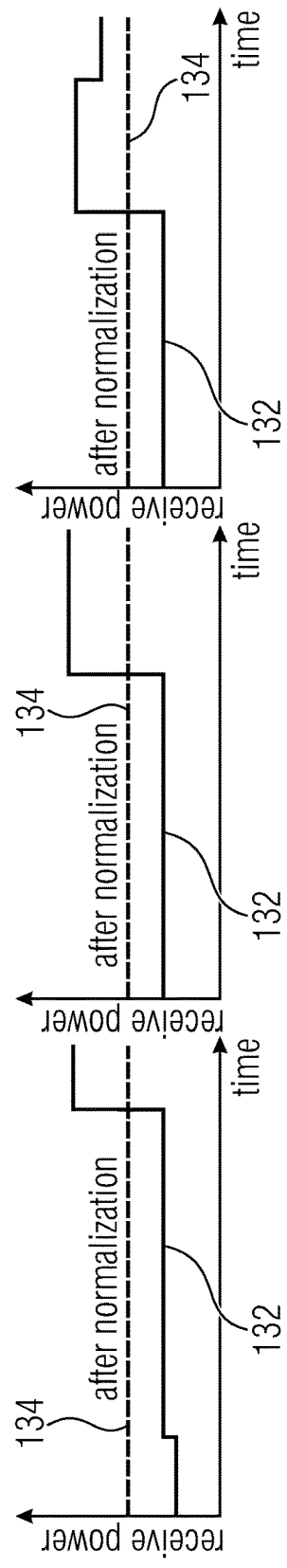
Fig. 9a
Fig. 9b

OPTIMIZED PREAMBLE AND METHOD FOR INTERFERENCE ROBUST PACKET DETECTION FOR TELEMETRY APPLICATIONS

CROSS-REFERENCE TO RELATED APPLICATIONS

This application is a continuation of copending International Application No. PCT/EP2016/057014, filed Mar. 31, 2016, which is incorporated herein by reference in its entirety.

BACKGROUND OF THE INVENTION

Embodiments relate to a receiver. Further embodiments relate to a method for receiving a data packet. Some embodiments relate to an optimized preamble. Some embodiments relate to interference robust detection. Some embodiments relate to preamble splitting. Some embodiments relate to a non-coherent correlation. Some embodiments relate to pilot signaling.

Systems for transmitting small amounts of data, for example, sensor data, from a large number of nodes, such as heating, electricity or water meters, to a base station are known. A base station receives (and possibly controls) a large number of nodes. At the base station more computing power and a more complex hardware, i.e. a receiver with higher performance, is available. In the nodes only cheap crystals are available, which generally have a frequency offset of 10 ppm or more.

In [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013] an improved coverage for low-power telemetry systems using telegram splitting is shown.

In [G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015] an increasing transmission reliability for telemetry systems using telegram splitting is shown.

In [R. De Gaudenzi, F. Giannetti, and M. Luise, "Signal recognition and signature code acquisition in CDMA mobile packet communications," IEEE Transactions on Vehicular Technology, vol. 47, no. 1, pp. 196-208, February 1998] a signal recognition and signature code acquisition in CDMA (CDMA=code division multiple access) mobile packet communications is discussed.

In [J. Block and E. W. Huang, "Packet Acquisition Performance of Frequency-Hop Spread-Spectrum Systems in Partial-Band Interference," in IEEE Military Communications Conference, 2007. MILCOM 2007, 2007, pp. 1-7] a packet acquisition performance of frequency-hop spread-spectrum systems in partial-band interference is discussed.

WO 2013/030303 A2 shows a battery-operated fixed sensor assembly having unidirectional data transmission.

SUMMARY

According to an embodiment, a receiver may have: a receiving unit configured to receive a data packet having a pilot sequence; a synchronization unit configured to separately correlate the pilot sequence with at least two partial reference sequences, in order to obtain a partial correlation result for each of the at least two partial reference sequences; wherein the synchronization unit is configured to non-coherently add the partial correlation results in order to obtain a coarse correlation result for the data packet; wherein the receiving unit is configured to receive at least two data packets, wherein each of the at least two data packets has a pilot sequence; wherein the synchronization unit is configured to separately correlate the pilot sequence of each of the at least two data packets with at least two partial reference sequences corresponding to a reference sequence for the pilot sequence of the corresponding data packet, in order to obtain a partial correlation result for each of the at least two partial reference sequences for each of the at least two data packets; wherein the synchronization unit is configured to non-coherently add at least a part of the partial correlation results for each of the at least two data packets in order to obtain a coarse correlation result for each of the at least two data packets; wherein the synchronization unit is configured to combine at least a part of the coarse correlation results of the at least two data packets, in order to obtain a combined coarse correlation result.

According to another embodiment, a receiver may have: a receiving unit configured to receive data packets, at least two of the data packets having a partial pilot sequence of at least two partial pilot sequences; a synchronization unit configured to separately correlate the partial pilot sequences with at least two partial reference sequences, in order to obtain a partial correlation result for each of the at least two partial reference sequences; wherein the synchronization unit is configured to non-coherently add the partial correlation results in order to obtain a coarse correlation result for the data packets; wherein the receiving unit is configured to receive further data packets, at least two of the further data packets having a partial pilot sequence of at least two partial pilot sequences; wherein the synchronization unit is configured to separately correlate the partial pilot sequences of the further data packets with at least two partial reference sequences, in order to obtain a partial correlation result for each of the at least two partial reference sequences, wherein the synchronization unit is configured to non-coherently add the partial correlation results for the further data packets in order to obtain a coarse correlation result for the further data packets; wherein the synchronization unit is configured to combine at least a part of the coarse correlation results of the data packets and the further data packets, in order to obtain a combined coarse correlation result.

According to still another embodiment, a method may have the steps of: receiving a data packet having a pilot sequence; separately correlating the pilot sequence with at least two partial reference sequences corresponding to a reference sequence for the pilot sequence of the data packet, in order to obtain partial correlation results for the at least two partial reference sequences; and non-coherently adding the partial correlation results in order to obtain a correlation result for the data packet; wherein receiving has receiving at least two data packets, wherein each of the at least two data packets has a pilot sequence; wherein separately correlating has separately correlating the pilot sequence of each of the at least two data packets with at least two partial reference sequences corresponding to a reference sequence for the pilot sequence of the corresponding data packet, in order to obtain a partial correlation result for each of the at least two partial reference sequences for each of the at least two data packets; wherein non-coherently adding has non-coherently adding at least a part of the partial correlation results for each of the at least two data packets in order to obtain a coarse correlation result for each of the at least two data packets; wherein the method further has combining at least a part of the coarse correlation results of the at least two data packets, in order to obtain a combined coarse correlation result.

According to another embodiment, a method may have the steps of: receiving data packets, at least two of the data packets having a partial pilot sequence of at least two partial pilot sequences; separately correlating the partial pilot sequences with at least two partial reference sequences, in order to obtain a partial correlation result for each of the at least two partial reference sequences; and non-coherently adding the partial correlation results in order to obtain a coarse correlation result for the data packets; wherein receiving has receiving further data packets, at least two of the further data packets having a partial pilot sequence of at least two partial pilot sequences; wherein separately correlating has separately correlating the partial pilot sequences of the further data packets with at least two partial reference sequences, in order to obtain a partial correlation result for each of the at least two partial reference sequences, wherein the synchronization unit is configured to non-coherently add the partial correlation results for the further data packets in order to obtain a coarse correlation result for the further data packets; wherein the method further has combining at least a part of the coarse correlation results of the data packets and the further data packets, in order to obtain a combined coarse correlation result.

Another embodiment may have a non-transitory digital storage medium having stored theron a computer program for performing a method having: receiving a data packet having a pilot sequence; separately correlating the pilot sequence with at least two partial reference sequences corresponding to a reference sequence for the pilot sequence of the data packet, in order to obtain partial correlation results for the at least two partial reference sequences; and non-coherently adding the partial correlation results in order to obtain a correlation result for the data packet; wherein receiving has receiving at least two data packets, wherein each of the at least two data packets has a pilot sequence; wherein separately correlating has separately correlating the pilot sequence of each of the at least two data packets with at least two partial reference sequences corresponding to a reference sequence for the pilot sequence of the corresponding data packet, in order to obtain a partial correlation result for each of the at least two partial reference sequences for each of the at least two data packets; wherein non-coherently adding has non-coherently adding at least a part of the partial correlation results for each of the at least two data packets in order to obtain a coarse correlation result for each of the at least two data packets; wherein the method further has combining at least a part of the coarse correlation results of the at least two data packets, in order to obtain a combined coarse correlation result, when said computer program is run by a computer.

Another embodiment may have a non-transitory digital storage medium having stored theron a computer program for performing a method having: receiving data packets, at least two of the data packets having a partial pilot sequence of at least two partial pilot sequences; separately correlating the partial pilot sequences with at least two partial reference sequences, in order to obtain a partial correlation result for each of the at least two partial reference sequences; and non-coherently adding the partial correlation results in order to obtain a coarse correlation result for the data packets; wherein receiving has receiving further data packets, at least two of the further data packets having a partial pilot sequence of at least two partial pilot sequences; wherein separately correlating has separately correlating the partial pilot sequences of the further data packets with at least two partial reference sequences, in order to obtain a partial correlation result for each of the at least two partial reference sequences, wherein the synchronization unit is configured to non-coherently add the partial correlation results for the further data packets in order to obtain a coarse correlation result for the further data packets; wherein the method further has combining at least a part of the coarse correlation results of the data packets and the further data packets, in order to obtain a combined coarse correlation result, when said computer program is run by a computer.

According to still another embodiment, a receiver may have: a receiving unit configured to receive a data packet having a pilot sequence; and a synchronization unit configured to correlate the pilot sequence and a reference sequence, in order to obtain a correlation result; wherein the synchronization unit is configured to apply a weight factor to symbols of the data packet, or to apply a weight factor to symbols of the pilot sequence, or to apply an individual weight factor to each symbol of the pilot sequence.

According to another embodiment, a receiver may have: a receiving unit configured to receive a data packet having a pilot sequence; and a synchronization unit configured to correlate the pilot sequence and a reference sequence, in order to obtain a correlation result; wherein the synchronization unit is configured to use a correlation window for detecting the data packet, wherein the data packet is detected by detecting the highest peak of all correlation peaks exceeding a predefined threshold within the correlation window; wherein the correlation window is divided into a plurality of time slots, each time slot having an index associated therewith; wherein if a correlation value above the predefined threshold is detected, the highest peak inside the correlation window is searched, wherein the data packet detection is blocked until the index of the highest correlation peak inside the detection window reaches a defined detection index.

Embodiments provide a receiver comprising a receiving unit and a synchronization unit. The receiving unit is configured to receive a data packet comprising a pilot sequence. The synchronization unit is configured to separately correlate the pilot sequence with at least two partial reference sequences corresponding to a reference sequence for the pilot sequence of the data packet, in order to obtain a partial correlation result for each of the at least two partial reference sequences, wherein the synchronization unit is configured to non-coherently add the partial correlation results in order to obtain a coarse correlation result for the data packet.

It is the idea of the present invention to synchronize a data packet by correlating the data packet (or a pilot sequence of the data packet) with at least two partial reference sequences, each of which is shorter than the pilot sequence contained within the data packet, in order to obtain, a partial correlation result for each of the at least two partial reference sequences, wherein the partial correlation results are non-coherently added thereby reducing some effects of a transmission channel over which the data packet is reduced, in order to improve synchronization performance.

Further embodiments provide a method, comprising:
receiving a data packet comprising a pilot sequence;
separately correlating the pilot sequence with at least two
  partial reference sequences corresponding to a reference sequence for the pilot sequence of the data packet,
  in order to obtain partial correlation results for the at
  least two partial reference sequences; and non-coherently adding the partial correlation results in order to obtain a correlation result for the data packet.

Further embodiments provide a receiver comprising a receiving unit and a synchronization unit. The receiving unit is configured to receive data packets (e.g., at least two data packets), at least two of the data packets (e.g., each of the at least two data packets) comprising a partial pilot sequence of at least two partial pilot sequences. The synchronization unit is configured to separately correlate the partial pilot sequences with at least two partial reference sequences, in order to obtain a partial correlation result for each of the at least two partial reference sequences. Thereby, the synchronization unit is configured to non-coherently add the partial correlation results in order to obtain a coarse correlation result for the two data packets.

Further embodiments provide a method, comprising:
receiving at least two data packets, each of the at least two data packets comprising a partial pilot sequence of at least two partial pilot sequences;
separately correlating the partial pilot sequences with at least two partial reference sequences, in order to obtain a partial correlation result for each of the at least two partial reference sequences; and
non-coherently adding the partial correlation results in order to obtain a coarse correlation result for the two data packets.

Further embodiments provide a receiver comprising a receiving unit and a synchronization unit. The receiving unit is configured to receive a data packet comprising a pilot sequence. The synchronization unit is configured to correlate the pilot sequence and a reference sequence, in order to obtain a correlation result. Thereby, the synchronization unit is configured to apply a weight factor to symbols of the data packet, or to apply a weight factor to symbols of the pilot sequence, or to apply an individual weight factor to each symbol of the pilot sequence.

Further embodiments provide a receiver comprising a receiving unit and a synchronization unit. The receiving unit is configured to receive a data packet comprising a pilot sequence. The synchronization unit is configured to correlate the pilot sequence and a reference sequence, in order to obtain a correlation result. Thereby, the synchronization unit is configured to use a correlation window for detecting the data packet, wherein the data packet is detected by detecting the highest peak of all correlation peaks exceeding a predefined threshold within the correlation window.

In some embodiments, non-coherently adding the partial correlation results involves discarding the phase information after the correlation, e.g., by by adding absolute values or squared absolute values or approximated absolute values of the partial correlation results.

In some embodiments, the synchronization unit can be configured to non-coherently add the partial correlation results by adding absolute values or squared absolute values or approximated absolute values of the partial correlation results.

In some embodiments, the at least two partial reference sequences can be at least two different parts of the reference sequence.

In some embodiments, the data packet can comprise at least two partial reference sequences as the reference sequence.

In some embodiments, the receiving unit can be configured to receive at least two data packets, wherein only a part of the at least two data packets comprises a pilot sequence, for example, the receiving unit can be configured to receive a data packet without a pilot sequence.

In some embodiments, the receiving unit can be configured to receive at least two data packets, wherein each of the at least two data packets can comprise a pilot sequence. The synchronization unit can be configured to separately correlate the pilot sequence of each of the at least two data packets with at least two partial reference sequences corresponding to a reference sequence for the pilot sequence of the corresponding data packet, in order to obtain a partial correlation result for each of the at least two partial reference sequences for each of the at least two data packets. Further, the synchronization unit can be configured to non-coherently add at least a part of the partial correlation results for each of the at least two data packets in order to obtain a coarse correlation result for each of the at least two data packets, and to combine at least a part of the coarse correlation results of the at least two data packets, in order to obtain a combined coarse correlation result.

The synchronization unit can be configured to combine the coarse correlation results of the at least two data packets by using a sum or approximations of an ideal Neyman-Pearson detector of the coarse correlation results of the at least two data packets.

In some embodiments, the at least two data packets can be parts of a telegram which can be transmitted separated into the at least two data packets. The receiver can further comprise a data packet combining unit configured to combine the at least two data packets in order to obtain the telegram.

The synchronization unit can be further configured to coherently add the partial correlation results, in order to obtain a fine correlation for the data packet.

Further, if the combined coarse correlation result exceeds a predefined threshold, the synchronization unit can be further configured to coherently add the partial correlation results for each of the at least two data packets in order to obtain a fine correlation result for each of the at least two data packets. For example, the synchronization unit can be configured to combine the fine correlation results of the at least two data packets, in order to obtain a combined fine correlation result.

The synchronization unit can be configured to normalize the coarse correlation results of the at least two data packets and to combine the normalized coarse correlation results of the at least two data packets, in order to obtain a coarse correlation result for the telegram.

Further, the synchronization unit can be configured to normalize the fine correlation results of the at least two data packets and to combine the normalized fine correlation results of the at least two data packets, in order to obtain a combined fine correlation result.

In some embodiments, the synchronization unit can be configured to estimate a frequency offset of the data packet.

For example, the synchronization unit can be configured to estimate the frequency offset in case of large offsets (e.g., greater than or equal to the data rate) by oversampling in the frequency domain and parallel correlation on several frequencies. The correlation result with the highest peak delivers the coarse frequency offset.

Further, the synchronization unit can be configured to estimate the frequency offset in case of small offsets (e.g., smaller than the data rate) based on phase difference between adjacent symbols.

Further, the synchronization unit can be configured to estimate the frequency offset in case of sufficiently large partial pilot sequences (e.g., dependent on a signal-to-noise ratio) directly based on these partial pilot sequences.

Further, the synchronization unit can be configured to estimate the frequency offset based on the coarse correlation result to obtain a coarse frequency offset, or based on the fine correlation result to obtain a fine frequency offset.

The receiver can comprise a header extraction unit configured to extract a header information from the data packet coded in a phase shift of the pilot sequence by applying a frequency correction to the data packet using the estimated frequency offset and estimating the phase shift of the pilot sequence.

In some embodiments, the synchronization unit can be configured to normalize symbols of the pilot sequence to obtain a normalized pilot sequence and to separately correlate the normalized pilot sequences with the at least two partial reference sequences.

In some embodiments, the synchronization unit can be configured to calculate a variance of the partial correlation results for the data packet and to detect the data packet if the variance of the partial correlation results for the data packet is smaller than or equal to a predefined threshold.

In some embodiments, the synchronization unit can be configured to apply a weight factor to symbols of the data packet, or to apply an individual weight factor to symbols of each of the at least two partial pilot sequences, or to apply an individual weight factor to each symbol of the at least two partial pilot sequences or to apply an individual weight factor to each of the at least two partial reference sequences, or to apply an individual weight factor to each symbol of the data packet.

In some embodiments, the synchronization unit can be configured to detect a main lobe and side lobes of the correlation and to provide the detected main lobe as correlation result using known distances between the main lobe and the side lobes.

In some embodiments, the synchronization unit can be configured to use a correlation window for detecting the data packet, wherein the data packet is detected by detecting the highest peak of all correlation peaks exceeding a predefined threshold within the correlation window.

Embodiments provide a computational efficient frequency insensitive detection of telegrams by use of partial correlation of preambles within sub-packets and combining over many sub-packets.

Further embodiments provide a robust transmission of (additional) header information using detection and synchronization pilots with no or only small impact on the receiver performance by using phase offsets for transmission of partial preambles parts (partial preambles) of the pilots of the sub-packets.

Further embodiments provide an interference robust detection.

BRIEF DESCRIPTION OF THE DRAWINGS

Embodiments of the present invention will be described herein making reference to the appended drawings, in which:

FIG. 7a shows a schematic view of a data packet with two partial pilot sequences and a data sequence, as well as a long interferer overlaying the data packet, for three different time slots;

FIG. 7b shows in diagrams receive power and normalized received power for sub-packet or telegram wide normalization plotted over time for each of the three different time slots;

FIG. 8a shows a schematic view of a data packet with two partial pilot sequences and a data sequence, as well as a short interferer overlaying the data packet, for three different time slots;

FIG. 8b shows in diagrams receive power and normalized received power for sub-packet or telegram wide normalization plotted over time for each of the three different time slots;

FIG. 9a shows a schematic view of a data packet with two partial pilot sequences and a data sequence, as well as a short interferer overlaying the data packet, for three different time slots;

FIG. 9b shows in diagrams receive power and normalized received power for symbol wide normalization plotted over time for each of the three different time slots;

DETAILED DESCRIPTION OF THE INVENTION

Figure 1:
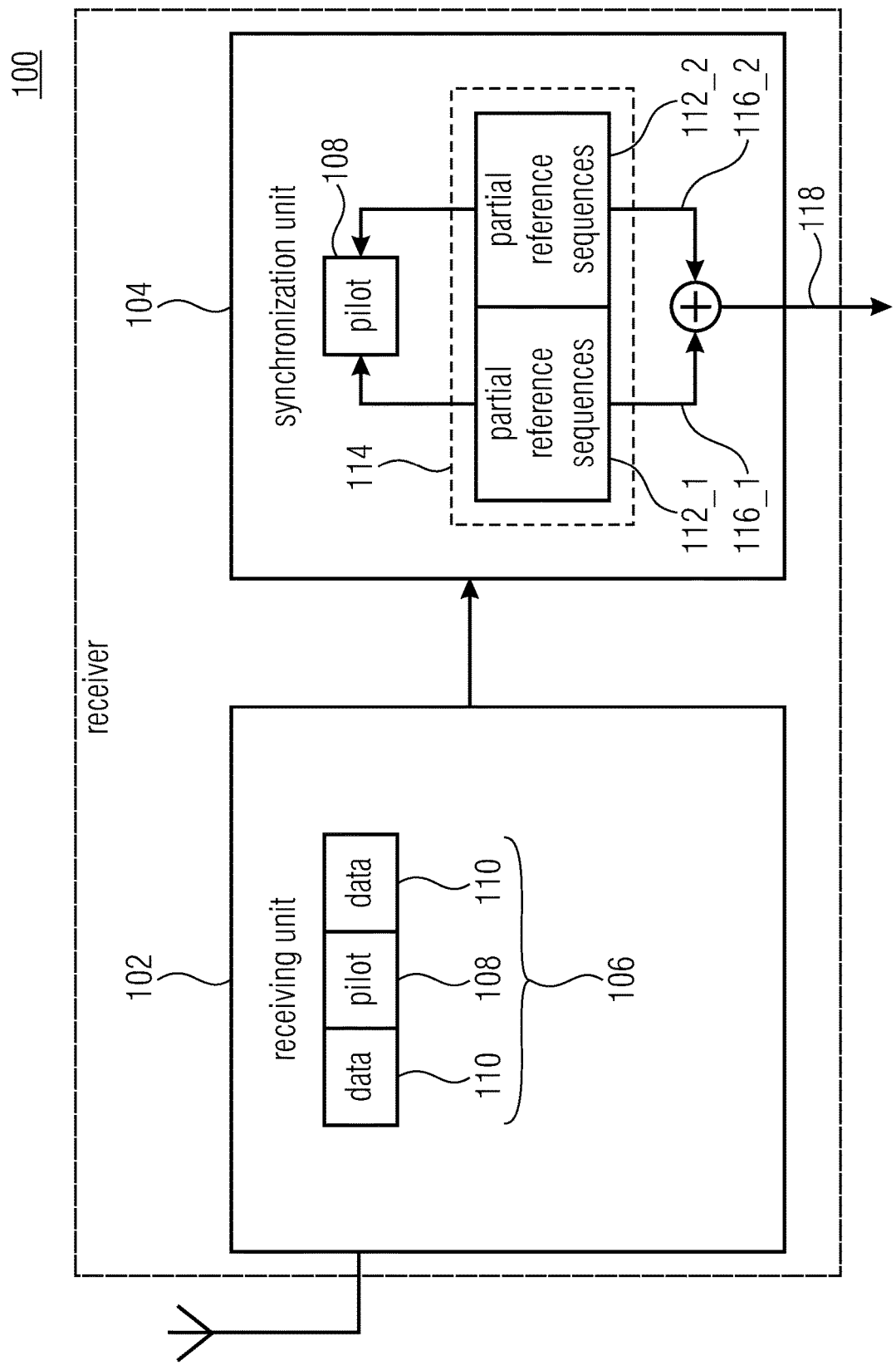
FIG. 1 shows a schematic block diagram of a receiver, according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of a receiver 100 according to an embodiment. The receiver 100 comprises a receiving unit 102 and a synchronization unit 104. The receiving unit 102 is configured to receive a data packet 106 comprising a pilot sequence 108.

For example, the receiving unit 102 can be configured to receive and demodulate a signal transmitted from a transmitter over a communication channel to the receiver 100, and to provide based thereon a data stream comprising the data packet 106.

The data packet 106 can comprise the pilot sequence 108 and one or more data sequences arranged before, after or between (not shown in FIG. 1, see, for example, FIG. 2) the pilot sequence 108. The data packet 106 can be part of a telegram which is transmitted separated into a plurality of data packets (or sub-packets).

The synchronization unit 104 is configured to separately correlate the pilot sequence 108 with at least two partial reference sequences 112_1 to 112_n (n can be a natural number greater than or equal to two), in order to obtain a partial correlation result 116_1 to 116_n for each of the at least two partial reference sequences 112_1 to 112_n, wherein the synchronization unit 104 is configured to non-coherently add the partial correlation results 116_1 to 116_n in order to obtain a coarse correlation result 118 for the data packet 106.

For example, the synchronization unit 104 can be configured to separately correlate the data stream provided by the receiving unit 102 with the at least two partial reference sequences 112_1 to 112_n.

Each of the at least two partial reference sequences 112_1 to 112_n can be shorter than the pilot sequence 108 of the data packet.

The at least two partial reference sequences 112_1 to 112_n can correspond to a reference sequence 114 for the pilot sequence 108 of the data packet 106, i.e. the at least two partial reference sequences 112_1 to 112_n can be parts of a reference sequence 114 for the pilot sequence 108 of the data packet. Assuming an ideal communication channel between transmitter and receiver 100, the reference sequence 108 and the pilot sequence are the same. Each of the at least two partial reference sequences 112_1 to 112_n can be shorter than the reference sequence 114. For example, the reference sequence 114 can be divided into at least two (or n) parts (or sets), in order to obtain the at least two (or n) partial reference sequences 112_1 to 112_n, i.e. a first part of the reference sequence 114 is a first of the at least two partial reference sequences 112_1 to 112_n and a second part of the reference sequence 114 is a second of the at least two partial reference sequences 112_1 to 112_n, and so on (if applicable).

The synchronization unit 104 can be configured to non-coherently add the partial correlation results by adding absolute values or squared absolute values or approximated absolute values of the partial correlation results.

Pilots (or a sequence of pilot symbols (pilot sequence)) can be transmitted within a data packet or sub-packet. Pilots can be used for at least one out of detection of the packet, time synchronization and frequency synchronization.

There are different ways for positioning of the pilots within the sub-packet as will become clear from the following discussion of FIG. 2a to 2f.

Figure 2A:
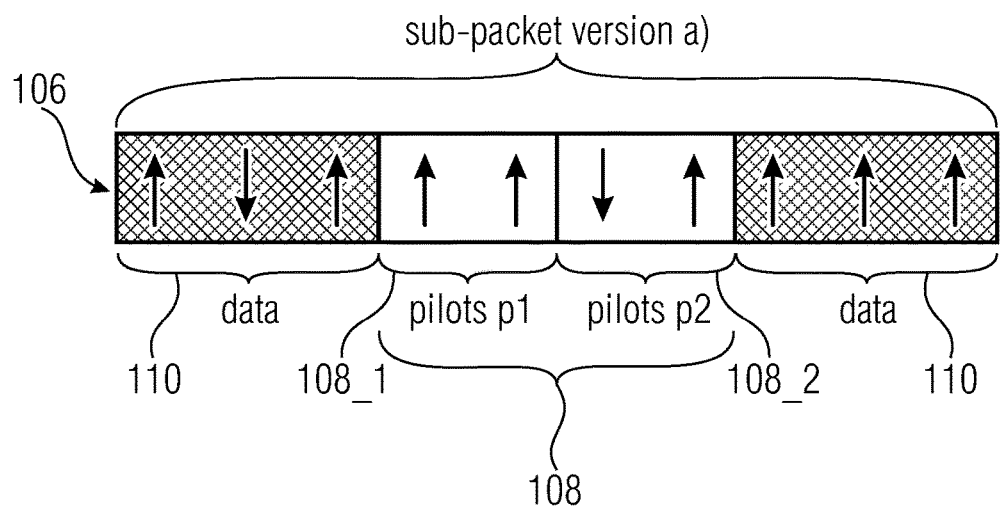
FIG. 2a shows a schematic view of a data packet (sub-packet), according to an embodiment.

FIG. 2a shows a schematic view of a data packet (sub-packet) 106 according to an embodiment. The data packet 106 comprises a pilot sequence 108 and two data sequences arranged before and after the pilot sequence 108. Symbols of the data packet 106 are indicated using a complex vector illustration, i.e. each arrow may illustrate one symbol of a modulation method used for transmitting the data packet.

As shown in FIG. 2a, in embodiments, the pilot sequence 108 can comprise at least two partial pilot sequences 108_1 to 108_n, i.e. the pilot sequence 108 can be separated into at least two partial pilot sequences 108_1 to 108_n. Thereby, each of the partial pilot sequences 108_1 to 108_n may have a corresponding partial reference sequence 112_1 to 112_n, for example, a first partial reference sequence 112_1 may have a corresponding first partial pilot sequence 108_1 (i.e. a correlation peak will be maximized when correlating the first partial reference sequence 112_1 and the first partial pilot sequence 108_1) and a second partial reference sequence 112_2 may have a corresponding second partial pilot sequence 108_2 (i.e. a correlation peak will be maximized when correlating the second partial reference sequence 112_2 and the second partial pilot sequence 108_2), and so on (if applicable).

Figure 2B:
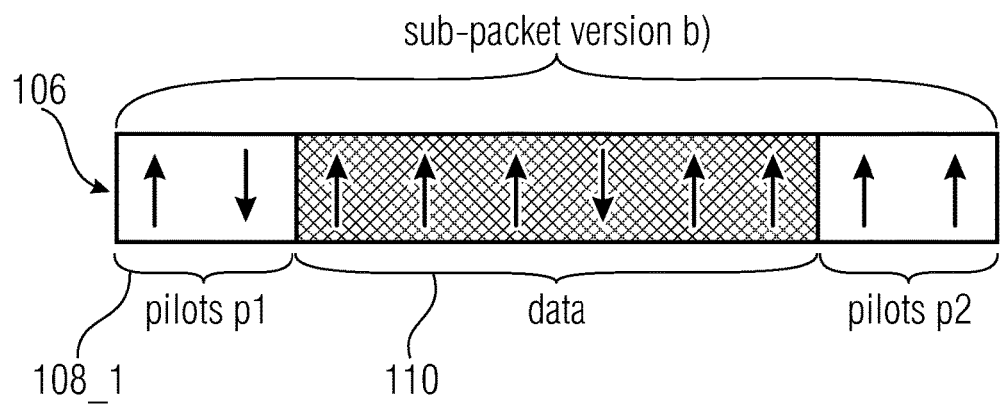
FIG. 2b shows a schematic view of a data packet (sub-packet), according to a further embodiment.

FIG. 2b shows a schematic view of a data packet (sub-packet) 106 according to an embodiment. The data packet 106 comprises two partial pilot sequences 108_1 and 108_2 and a data sequences 110 arranged between the two partial pilot sequences 108_1 and 108_2. Symbols of the data packet 106 are indicated using a complex vector illustration, i.e. each arrow may illustrate one symbol of a modulation method used for transmitting the data packet.

Figure 2C:
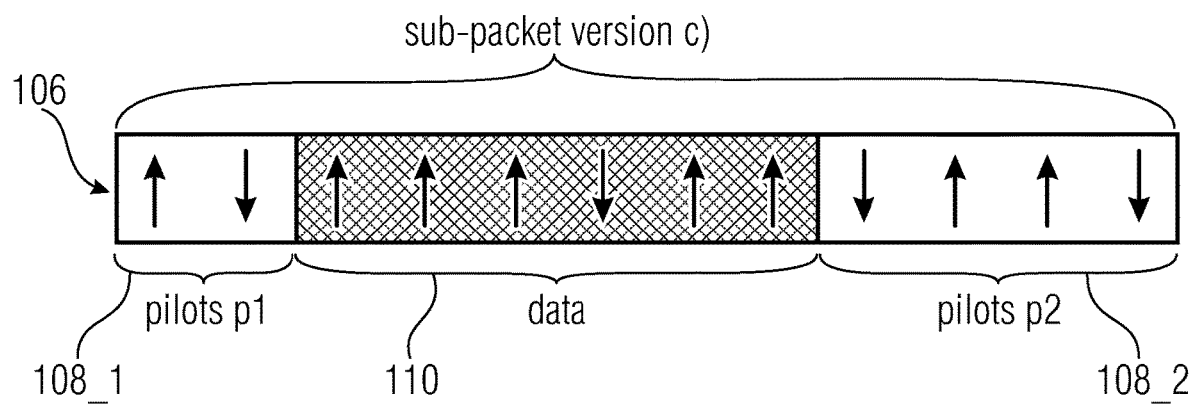
FIG. 2c shows a schematic view of a data packet (sub-packet), according to a further embodiment.

FIG. 2c shows a schematic view of a data packet (sub-packet) 106 according to an embodiment. The data packet 106 comprises two partial pilot sequences 108_1 and 108_2 and a data sequences 110 arranged between the two partial pilot sequences 108_1 and 108_2. Thereby, the second partial pilot sequence 108_2 is longer (e.g., twice as long) than the first reference sequence 108_1. Symbols of the data packet 106 are indicated using a complex vector illustration, i.e. each arrow may illustrate one symbol of a modulation method used for transmitting the data packet.

Figure 2D:
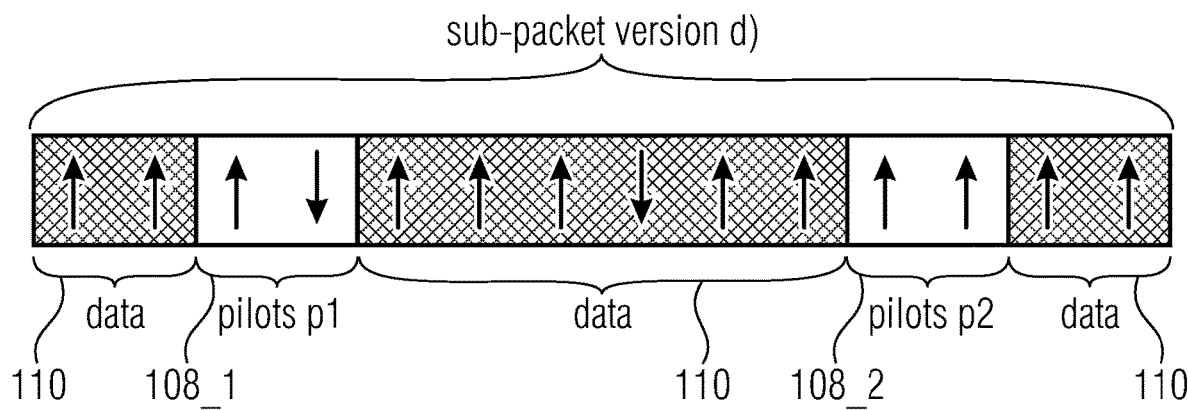
FIG. 2d shows a schematic view of a data packet (sub-packet), according to a further embodiment.

FIG. 2d shows a schematic view of a data packet (sub-packet) 106 according to an embodiment. The data packet 106 comprises two partial pilot sequences 108_1 and 108_2 and three data sequences 110 arranged before, after and between the two partial pilot sequences 108_1 and 108_2. Symbols of the data packet 106 are indicated using a complex vector illustration, i.e. each arrow may illustrate one symbol of a modulation method used for transmitting the data packet.

Figure 2E:
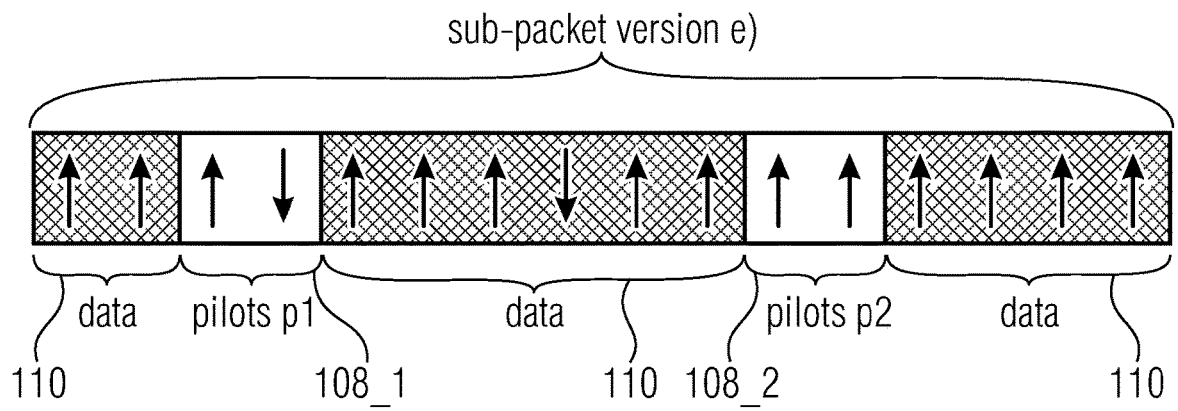
FIG. 2e shows a schematic view of a data packet (sub-packet), according to a further embodiment.

FIG. 2e shows a schematic view of a data packet (sub-packet) 106 according to an embodiment. The data packet 106 comprises two partial pilot sequences 108_1 and 108_2 and three data sequences 110 arranged before, after and between the two partial pilot sequences 108_1 and 108_2. Symbols of the data packet 106 are indicated using a complex vector illustration, i.e. each arrow may illustrate one symbol of a modulation method used for transmitting the data packet. Symbols of the data packet 106 are indicated using a complex vector illustration, i.e. each arrow may illustrate one symbol of a modulation method used for transmitting the data packet.

Figure 2F:
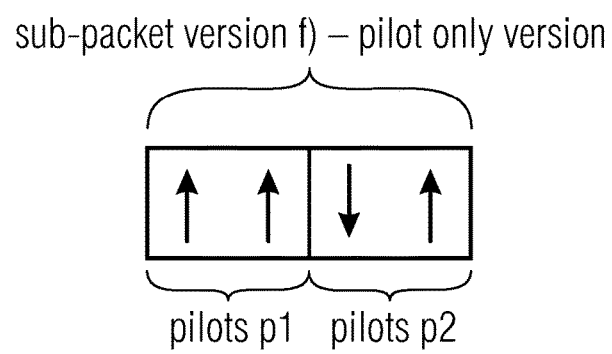
FIG. 2f shows a schematic view of a data packet (sub-packet), according to a further embodiment.

FIG. 2f shows a schematic view of a data packet (sub-packet) 106 according to an embodiment. The data packet 106 consists of a pilot sequence 108 that is separated (or can be separated by the receiver 100) into the two partial pilot sequences 108_1 and 108_2. Symbols of the data packet 106 are indicated using a complex vector illustration, i.e. each arrow may illustrate one symbol of a modulation method used for transmitting the data packet.

Pilots 108 may but are not required to use the same modulation scheme as the data part 110. The pilots 108 of each data packet 106 can be split at least into two parts, here as example p1 (108_1) and p2 (108_2). The at least two parts p1 (108_1) and p2 (108_2) may but are not required to be temporally separated. The signal over time of p1 (108_1) and p2 (108_2) can be known to the receiver 100. The signal received at the receiver 100 can be affected by channel impairments such as noise. Due to an offset of the crystals used the transmitter and the receiver 100 the exact time, frequency offset and phase offset of the received signal are initially not known to the receiver 100.

In order to detect the signal the receiver 100 might perform a cross correlation of the whole signal p1 (108_1) and p2 (108_2) versus the received signal. In the presence of a frequency offset this will reduce the correlation peak.

Figure 3:
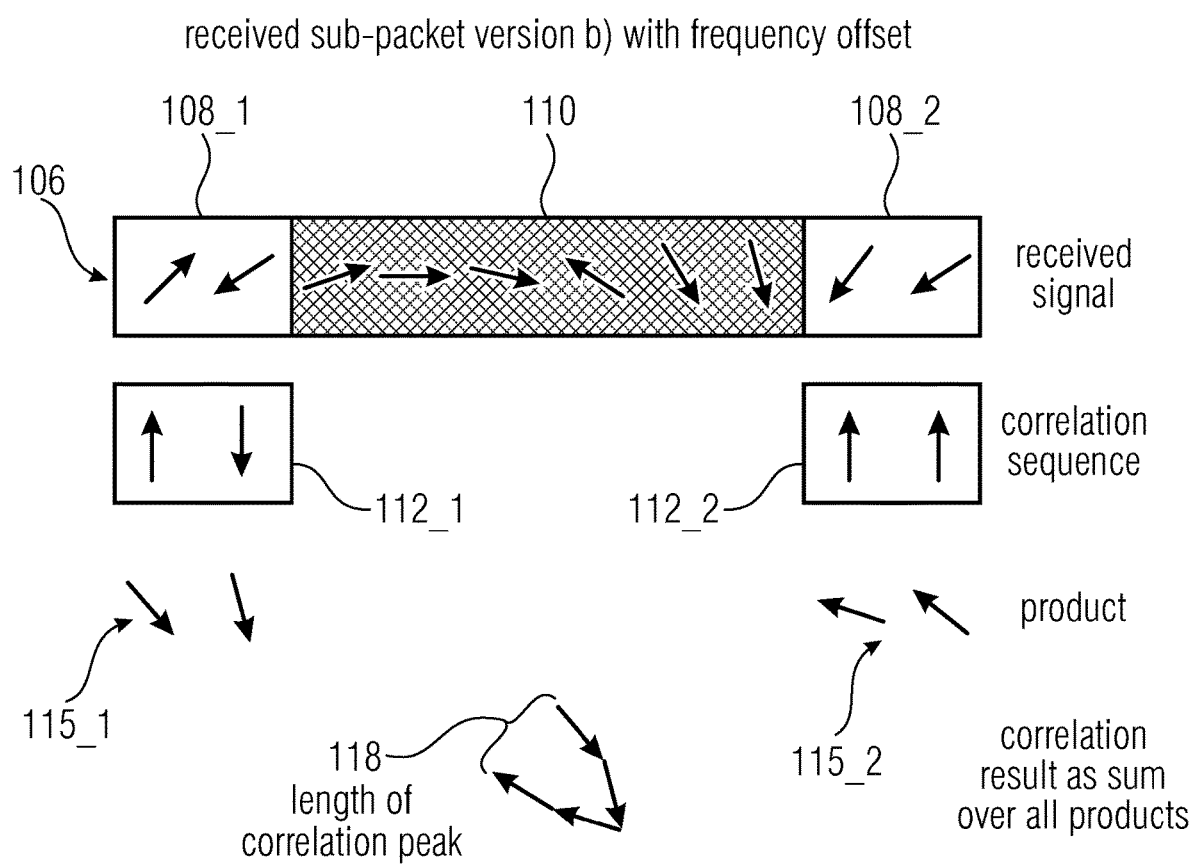
FIG. 3 shows a schematic view of a synchronization of a data packet, according to EP 2 914 039 A1.

EP 2 914 039 A1 proposes to use sub-packet version in order to reduce these effects, as will become clear from the discussion of FIG. 3.

In detail, FIG. 3 shows a schematic view of the synchronization of the data packet 106 according to EP 2 914 039 A1. The data packet 106 received corresponds to the data packet shown in FIG. 2b. However, the data packet 106 is affected by a frequency offset, which is indicated in FIG. 3 by a rotation of the vectors used for describing the symbols of the data packet.

Further, in FIG. 3, the reference sequences (or correlation sequences) 112_1 and 112_2, the correlation products 115_1 and 115_2 obtained by correlating the reference sequences (or correlation sequences) 112_1 and 112_2 with the data packet 106, and the correlation result as sum over all products are shown. Thereby, a length of the correlation peak is reduced due to the frequency offset.

For larger frequency offsets even the correlation peak of the sub-packet shown in FIG. 2a might be reduced in a significant manner.

Detection Combined Partial Preamble Correlation

In contrast to FIG. 3, embodiments provide detection combined partial preamble correlation (cppc). Thereby, a non-coherent combination of at least two received partial preamble parts (rp1, rp2, . . . ) within small sub-packets may be used.

For example, some embodiments propose a non-coherent combination of code matched filter outputs for CDMA detection. In a long stream of data multiple matched filter outputs of single CDMA symbols can be combined.

Further, embodiments propose different ways of non-coherent combination of correlation results of the single hops of a frequency hop spread spectrum system. Correlation results of single hops can be combined.

As will become clear from the following discussion, first, a non-coherent combination on sub-packet (or HOP) level can be used (see FIG. 4), and second, a combination of the already combined sub-packet level results to an overall result can be used.

Figure 4:
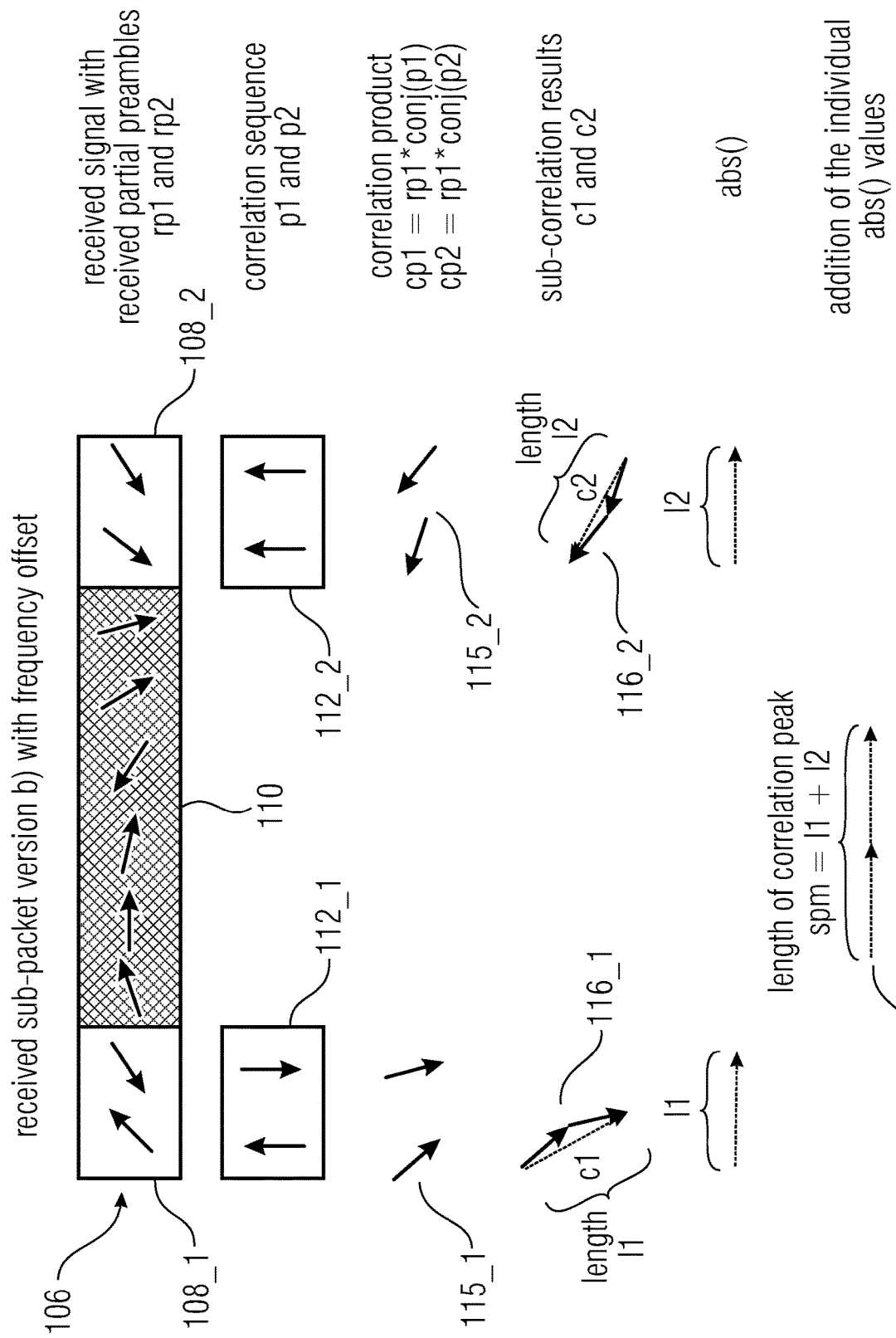
FIG. 4 shows a schematic view of a synchronization of a data packet, according to an embodiment.

FIG. 4 shows a schematic view of the synchronization of the data packet 106 according to an embodiment. The data packet 106 received corresponds to the data packet 106 shown in FIG. 2b. However, the data packet 106 is affected by a frequency offset, which is indicated in FIG. 4 by a rotation of the vectors used for describing the symbols of the data packet.

Further, in FIG. 4, the at least two partial reference sequences (or correlation sequences) rp1 (108_1) and rp2 (108_2), the correlation products cp1 (115_1) and cp2 (115_2) obtained by correlating the at least two partial reference sequences (or correlation sequences) 108_1 and 108_2 with the data packet 106, the partial correlation results c1 (116_1) and c2 (116_2) obtained by summing the individual correlation products cp1 (115_1) and cp2 (115_2) (e.g., using the equations cp1=rp1*conj(p1) and cp2=rp2*conj(p2)), and the coarse correlation result spm (118) for the data packet 106 obtained by non-coherently adding the partial correlation results c1 (116_1) and c2 (116_2) are shown.

In other words, as indicated in FIG. 4, a correlation of the first partial pilot sequence rp1 (108_1) and the second partial pilot sequence rp2 (108_2) with the first partial reference sequence p1 (112_1) and the second partial reference sequence p2 (112_2) is performed, respectively. This results in the partial correlation results c1 (116_1) and c2 (116_2).

Further, a non-linear operation like abs( ), an approximation of abs( ), or any other non-linear operation can be applied to the partial correlation results c1 (116_1) and c2 (116_2) of the partial preamble parts of the sub-packets or any approximation of the ideal Neyman-Pearson detector. This results in values I1 and I2. Addition of the values results in the sub-packet preamble metric spm=I1+I2. In the presence of frequency offset the spm=I1+I2 is longer as for direct correlation cdirect=abs(c1+c2), even for the sub-packet shown in FIG. 2a. This provides the following advantage. The method is robust versus frequency offset. In the presence of large crystal offsets between transmitters and receivers less sub-band have to be searched in order to find a preamble.

As already mentioned, the data packet 106 can be part of a telegram which is transmitted separated into a plurality of data packets (or sub-packets).

The receiving unit 102 can be configured to receive at least two data packets 106, wherein each of the at least two data packets 106 comprises a pilot sequence 108, wherein the at least two data packets 106 are parts of a telegram which is transmitted separated into the at least two data packets 106. The synchronization unit 104 can be configured to separately correlate the pilot sequence 108 of each of the at least two data packets with at least two partial reference sequences p1 (112_1) and p2 (112_2) corresponding to a reference sequence for the pilot sequence of the corresponding data packet 106, in order to obtain a partial correlation result c1 (116_1) and c2 (116_2) for each of the at least two partial reference sequences p1 (112_1) and p2 (112_2) for each of the at least two data packets 106. Further, the synchronization unit 104 can be configured to non-coherently add the partial correlation results c1 (116_1) and c2 (116_2) for each of the at least two data packets in order to obtain a coarse correlation result spm (118) for each of the at least two data packets 106. Further, the synchronization unit 104 can be configured to combine the coarse correlation results spm (118) of the at least two data packets 106, in order to obtain a coarse correlation result for the telegram.

In other words, the coarse correlation results spm (118) of the sub-packets (which also can be based on one partial correlation only) can be combined to a telegram preamble metric (or coarse correlation result for the telegram) tpm. Combining can be, for example, performed by a simple sum or by other approximations of ideal Neyman-Pearson detector.

This has the advantage that less computational power is needed.

Figure 15:
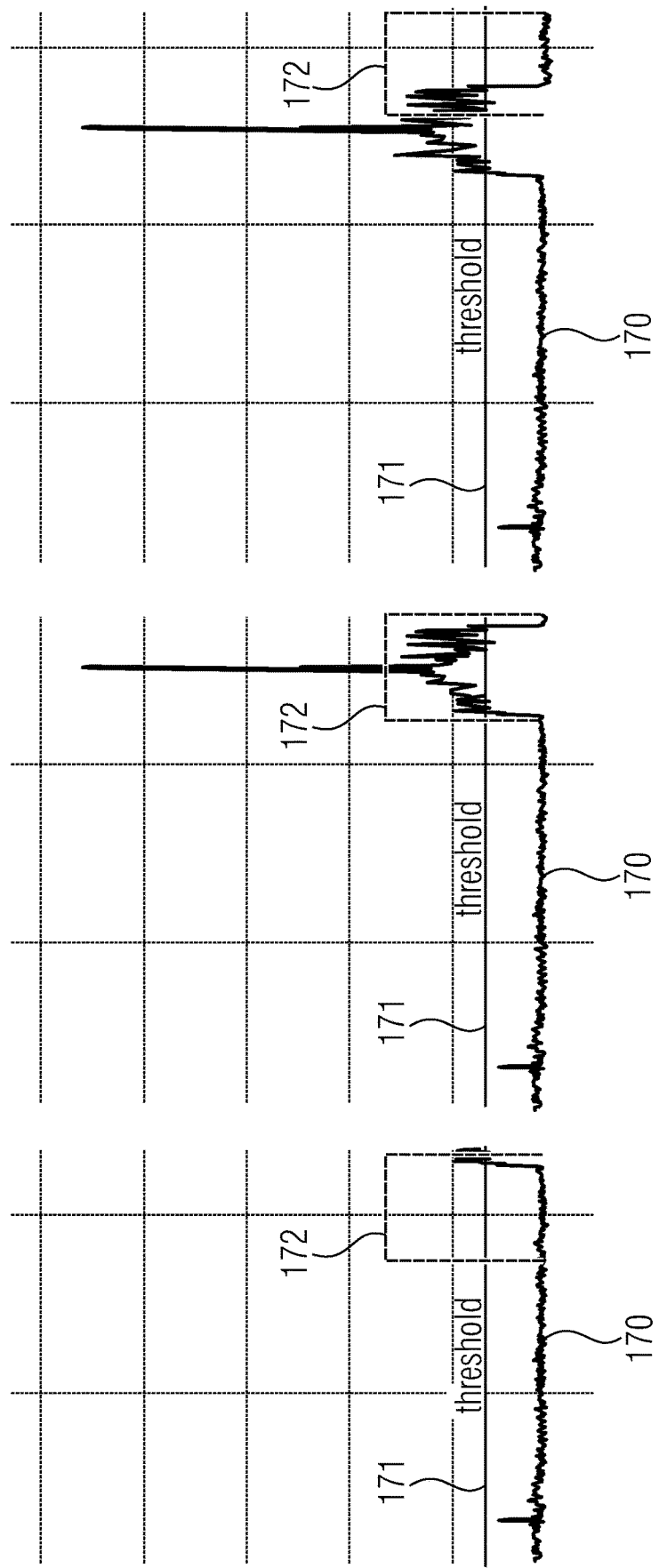
FIG. 15 shows in three diagrams amplitudes of correlation results plotted over time for three different time slots as well as the threshold and the detection window used for detecting the data packet, according to an embodiment.

For example, 30 sub-packets with two partial preambles in each sub-packet can be used, e.g., 15 times the sub-packet version a) shown in FIG. 2a and 15 times the sub-packet version b) shown in FIG. 2b. Using only one sum in each time step 60 additions are used, i.e. sub-packets multiplied by 2 partial preambles. If, as proposed, two successive sums are used, computational power can be reduced. In each time step spm over sub-packet version a) and one sum over sub-packet version b) can be calculated. The resulting spm a) and spm b) can be stored in a memory. Then a sum over the pre-calculated spm a) and spm b) can be calculated over the according values stored in memory. In that case, only two additions for the pre-calculation and 30 additions for the final sum are used.

The synchronization unit 104 can be further configured, if the coarse correlation result for the telegram exceeds a predefined threshold, to coherently add the partial correlation results c1 (116_1) and c2 (116_2) for each of the at least two data packets 106 in order to obtain a fine correlation result for each of the at least two data packets 106. Further, the synchronization unit 104 can be configured to combine the fine correlation results of the at least two data packets, in order to obtain a fine correlation result for the telegram.

In other words, a first search (or stage) with non-coherent addition can be combined with a second search (or stage) with coherent addition.

The earlier described technique with non-coherent addition of at least two sync parts of one sub packet can be used. Afterwards the sum over all sub packets can be calculated. This value can be compared to a threshold and if the value is above the threshold a second correlation can be done.

The second stage can calculate the correlation with coherent addition of all parts inside a sub packet or over all hops of a telegram. This is done as a hypothesis test for many different hypothetical frequency offsets. The value resulting on coherent addition of the sub-correlation results is also compared against a threshold. If the value is in the detection range, the begin of a packet is detected. The first stage (non-coherent addition) yields a coarse frequency offset, which is needed for the second stage. The second stage provides a more precise frequency offset, which can be used in the following decoder.

This technique uses a two-stage detection. The second correlation is much more frequency sensitive than the first one, so there are more calculations on different frequency offsets. To reduce the computation power the second correlation is only done, if the first stage detects a packet. Therefore the increase of computation power is very low.

This technique also provides a fine estimated frequency offset, which is helpful for the decoder. The decoder saves computation power because it doesn't have to calculate the frequency offset again.

Using Pilots for Signalling of Header Information

In the following embodiments are described which used the pilots for signalling of header information.

The data packet 106 can comprise header information coded in a phase shift of the pilot sequence 108. The receiver 100 can comprise a header extraction unit configured to extract the header information from the data packet by applying a frequency correction to the data packet using an estimated frequency offset of the data packet 106 and estimating the phase shift of the pilot sequence.

If combined partial preamble correlation (cppc) or other schemes are used, the performance of the preamble detector can be totally Insensitive or insensitive in a tolerable manner against phase rotations of the transmitted partial pilot sequences p1 (108_1) and p2 (108_2).

The transmitter can add an arbitrary phase shift phi in the range of [−pi, pi] to the partial pilot sequences p1 (108_1) and p2 (108_2).

Proposed shifting schemes are among others
p1'=p1*exp(2*pi*phi), p2'=p2*exp(−2*pi*phi), i.e. p1 and p2 are shifted in opposite direction;
p1'=p1, p2'=p2*exp(−2*pi*phi), i.e. only p2 is shifted;
p'=p1*exp(2*pi*phi), p2'=p2, i.e. only p1 is shifted;
wherein p1' is the phase shifted version of p1 and p2' is the phase shifted version of p2.

Furthermore, a combination of the described schemes is possible. All differential phase modulation schemes might be used. Phase shifts can be calculated for all or a subset of the partial pilot sequences/sub-packets by encoding the header bits to be transmitted b with a forward error correction (FEC) code resulting in transmitter code symbols c. Golay Codes, BCH Codes, Convolutional codes or Turbo Codes or LDPC Codes or other codes might be used. The code symbols can be mapped to phase shifts phi_i with index i for the partial pilot sequences/sub-packet i.

Generating p1 to p2 Phase Offset if the Preamble is MSK/GMSK Modulated

Subsequently, a generation of phase offsets of the partial pilot sequences p1 (108_1) and p2 (108_2) of a MSK (MSK=minimum shift keying) or GMSK (GMSK=Gaussian filtered minimum shift keying) modulated preamble 108 is described.

If the system uses MSK or GMSK modulation for the packets, the transmitters can easily adopted to introduce a phase offset for the partial pilot sequences p1 (108_1) or p2 (108_2). Further on we will concentrate on p2.

If differential MSK/GMSK is used, then the first bit of p2 can be inverted and/or the first symbol of the data part after p2 can be inverting, if existing.

If precoded MSK/GMSK is used, then all symbols of p2 can be inverted.

Decoding the Received Phase Shifts

The receiver 100 (or the synchronization unit 104) can be configured to:

1. perform a rough estimate of the frequency offset f_r of the received signal by inspection of the partial preambles (e.g., the phase difference of the received symbols in cp1 and cp2 can be analysed);
2. perform a rough frequency correction rp1'=rp1*exp(−2*p*f_r) and rp2'=rp2*exp(−2*p*f_r)
3. estimate the phase offset phi' between rp1' and rp2' (e.g. by calculation of phi'=arg(c1*conj(c2)), note that the design of p1 and p2 can be preformed such that the rough frequency correction is sufficient that phi' can be estimated without phase ambiguity in most cases);

4. to calculate a log-likelihood llr_i or a simplified estimation of the transmitted phi_i; and
5. decode the transmitted header bit vector h_e out of the llr_i by the channel decoder.

Removement of Transmitted Phase Offsets in the Preamble

When the vector h_e has been decoded at the receiver it can be encoded again. This gives the list of phase offsets phi_e_i.

This phase offsets phi_e_i can be used to remove the phase shift of the received partial preambles (rp2 here) in the received signal. Thus, the decoder can continue decoding the received sub-packets in the same way as without transmission of header information.

Interference Robust Detection

The transmission is usually done in unlicensed bands (e. g. ISM (ISM=industrial, scientific and medical) bands) and/or the sensor nodes are not synchronized with the base station. Therefore interference with other systems using the same time slot will occur. If the system is not synchronized with the base station, interference with other sensor nodes will also occur.

Figure 5:
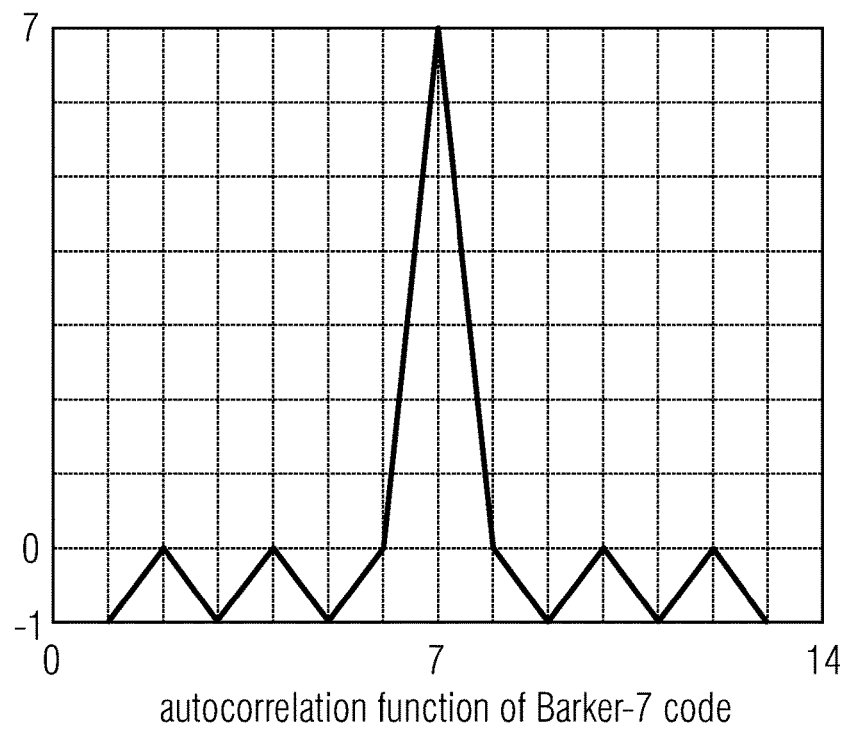
FIG. 5 shows in a diagram an amplitude of an autocorrelation function of Barker-7 code plotter over time.

This interference negatively influences the performance of the detection in the receiver. On the one hand it can reduce the correlation result of the correlation of the main lobe and on the other hand it will increase side lobes, which are unwanted. These side lobes are shown in FIG. 5 for a barker code with length of 7. The side lobes are peaks, which are not in the middle of the autocorrelation function and are unequal to zero.

To avoid false detection at side lobes the threshold needs to be greater than the highest side lobe.

In the autocorrelation function 13 values are calculated, so one time slot equals one symbol time. It's also possible to use more time slots (e. g. one time slot equals ½ symbol time) or less time slots (e. g. one time slot equals 2 symbol times).

Figure 6:
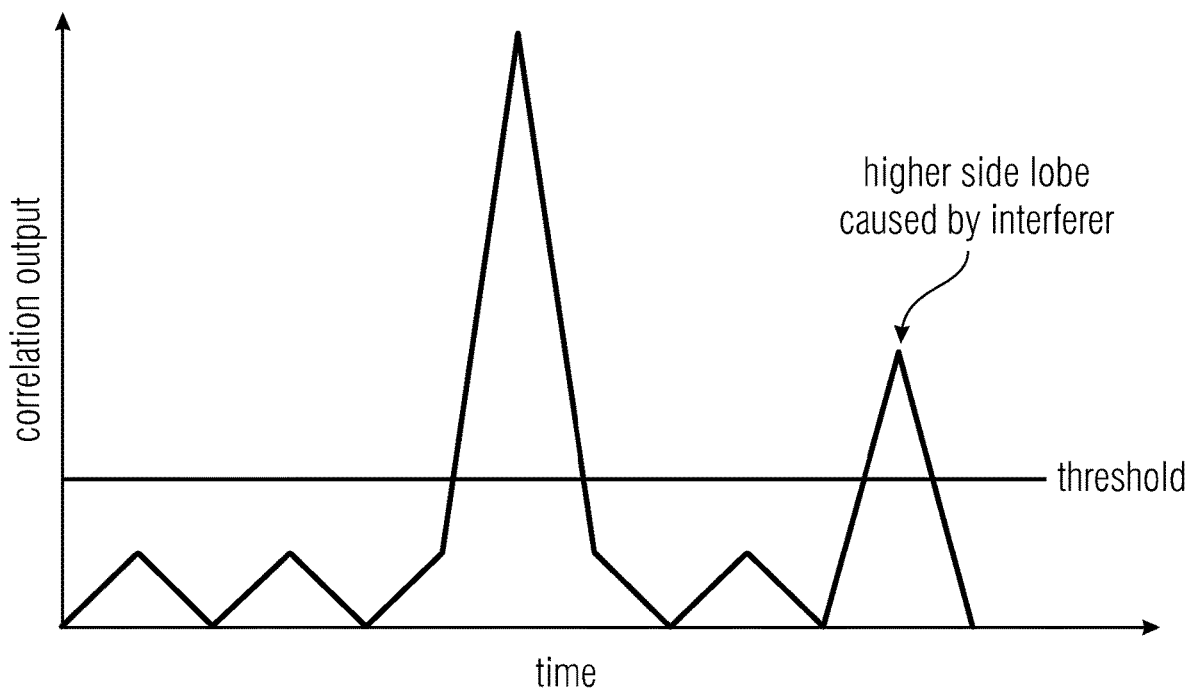
FIG. 6 shows in a diagram an amplitude of an autocorrelation function of Barker-7 code with a higher side lobe caused by an interferer plotter over time.

If an interferer with strong power at the receiver is on air, the correlation result is in most cases at this time slot very high and a false detection can occur. This is shown in FIG. 6. An interferer has increased the correlation result and created an "interference peak" so the value is above the defined threshold, which leads to false detection.

There are some techniques to decrease the number of false detections, in case of interference and/or for non-ideal correlation sequences, which are described in the following. They can be used standalone or they can used in combination to achieve a better result.

Normalization

If an interferer occurs in the used band of the wanted signal, distortion of the transmitted symbols is possible. Distortion in this case is an arbitrary phase- and amplitude-offset on each symbol during the transmit time of an interferer.

To reduce the impact of such interferers, normalization is done. This nonlinear operation equals the power over one sub packet, telegram or of each transmitted symbol.

In other words, for sub packet wise normalization e. g. the mean power over the length of one sub packet is calculated. This calculation is done for each time slot separately. $Pmean[m]=sum(Pin)/N$ (Pin are the power of the symbols inside the sub packet length, N the length of one sub packet in symbols, m is the index for each time slot).

This value is applied to all symbols of the length of one sub packet inside the according time slot. For example, the receive power of each symbol is divided by the mean power of one sub packet ($Pout[k]=Pin[k]/Pmean[m]$, k=symbol number inside the sub packet length).

FIG. 7a shows a schematic view of a data packet 106 with two partial pilot sequences 108_1 and 108_2 and a data sequence 110, wherein the data packet 106 is overlaid (or superimposed) by a long interferer 130. FIG. 7b shows in diagrams receive power and normalized received power plotted over time for each of the three time slots of FIG. 7a.

In detail, FIGS. 7a and 7b show an example for this technique, with three different time slots. For each time slot the length of one sub packet in symbols is cut. The second time slot shows the perfect one, where all symbols of the sub packet are inside the cut area. The first and the last one are too early or too late.

On all three time slots an interferer is the whole time active and it is assumed that the power of the interferer is much higher than the symbol power. The receive power (sum of signal plus interferer in the used band) is shown as line 132 in all three cases in the diagrams of FIG. 7b.

After the cut, the mean power with the equation described above is calculated for each time slot. In each time slot each symbol is divided by this mean power value, described with the above equation. Therefore the mean power in each time slot is now equal to one. If no interferer is during a transmission on air, the mean power after normalization is also equal to one. The impact of a completely interfered sub packet is now the same, as one without interferer in it. The normalized receive power is shown as line 134 in all three cases in the diagrams of FIG. 7b.

It is also possible for the calculation of the normalization value, to cut more than the length of one sub packet, e. g. the length of two sub packets. In this case we also cut % of the length before and behind the sub packet. The longer the used length for the calculation of the normalization value is, the better is the result against short interferer. A short interferer increases only a subset of symbols inside the area, which is used for the calculation. If only a small subset of symbol is interfered, the impact of these symbols is very low.

This method works fine if the duration of an interferer is much larger than the duration of one sub packet. If the duration is in the same region or shorter than the sub packet duration, this normalization yields unusable results. This problem is explained with an example in FIGS. 8a and 8b.

FIG. 8a shows a schematic view of a data packet 106 with two partial pilot sequences 108_1 and 108_2 and a data sequence 110, wherein the data packet 106 is overlaid (or superimposed) by a short interferer 130. FIG. 8b shows in diagrams receive power and normalized received power plotted over time for each of the three time slots of FIG. 8a. The receive power (sum of signal plus interferer in the used band) is shown as line 132 in all three cases in the diagrams of FIG. 8b. The normalized receive power is shown as line 134 in all three cases in the diagrams of FIG. 8b.

As shown in FIGS. 8a and 8b, the interferer 130 is only for a partial time of the sub packet duration active, therefore not all symbols have the same receive power.

The normalization factor is calculated over all symbols in this time slot. Afterwards this factor is applied to all symbols inside the sub packet length. Therefore the interfered symbols have a much higher amplitude after the normalization.

In the first time slot the interferer is only for a small subset of symbols active and the impact of the interferer power in the normalization factor is very low. In the both other cases the impact of the interferer is higher. The normalization decreases all symbols in this time slot, to get the mean power distribution to one inside this time slot. The not interfered symbols are also decreased as the interfered symbols. Afterwards in the correlation the correct symbols are threated lower than the interfered symbols. The output after the normalization is shown with lines 134 in the FIG. 8b. If the interfered symbols have more impact on the correlation result, false detections are possible.

If the interferer lengths are unknown or the length is not much greater the duration on a sub packet, symbol wise normalization can be done to solve the problem described before.

The symbol wise normalization works in the same way as the sub packet wise normalization, except of the normalization factors. These are calculated for each symbol inside the sub packet length separately and not only one for the whole sub packet length. FIGS. 9a and 9b shows the technique.

FIG. 9a shows a schematic view of a data packet 106 with two partial pilot sequences 108_1 and 108_2 and a data sequence 110, wherein the data packet 106 is overlaid (or superimposed) by a short interferer 130. FIG. 9b shows in diagrams receive power and normalized received power plotted over time for each of the three time slots of FIG. 9a. The receive power (sum of signal plus interferer in the used band) is shown as line 132 in all three cases in the diagrams of FIG. 9b. The normalized receive power is shown as line 134 in all three cases in the diagrams of FIG. 9b.

Each symbol is normalized to the same power, e. g. by division with its own symbol power. Furthermore the output of the correlation depends only on the received phases of the synchronization sequence.

In the correlation all symbols are threated equal and the effect of interfered symbols is less than without normalization.

Instead of doing the normalization before the correlation, normalization of the correlation product is also possible.

The correlation product can be derived using $cp1=rp1*conj(p1)$ in each time slot. $rp1$ is the received synchronization (or pilot) sequence, $p1$ the known ideal synchronization (or pilot) sequence and $cp1$ is the correlation result. This technique can be done with one correlation over the whole sequence or can be done with sub correlations, as described before.

However, the output signal $cp1$ may not provide any clear information whether a signal was present or not, as also a strong noise impulse can lead to high levels of $cp1$. Therefore one possibility is the normalization of the output signal by $norm1=abs(rp1)*abs(p1)$.

The normalized output is then given by $cp1norm=cp1/norm1$. If the pilot sequence 108 has constant power (which is assumed in the following), the value of $cp1norm$ can take values from 0 to 1. The value of 1 indicates full correlation. In case signals that do not include the signal $p1$, the absolute value of $cp1$ will be smaller than $norm1$.

Alternatively, $norm1$ can be calculated as $norm1=abs(rp1)*c$, where c is a constant that can be adjusted that $cp1norm$ reaches a maximum value of one.

Alternatively, $norm1$ can be calculated as $norm1=sqrt(abs(rp1^2))*c$, or $norm1=sqrt((abs(rp1)*abs(p1))^2)$.

Normalization of the input symbols can be done. Normalization is a nonlinear technique, e. g. the absolute value or the power is used. There are different techniques which depend on the interference scenario:

sub packet wise normalization;
telegram wise normalization; and
symbol wise normalization This has the advantage of reducing the impact of interferer in the correlation result. Therefore, the number of false detection is decreased. If a false detection occurs, the decoder tries to decode the packet, but the CRC (CRC=cyclic redundancy check) fails. If the number of false detections is decreased, the used CPU time is reduced and other applications can use the CPU time or the power consumption of the device is lower.

Variance

As described above the packet detection calculates the correlation for all synchronization sequences and the addition of the absolute value of all sub correlations yields the output. If only one sequence is used, the sequence can be split into sub parts as described before. If the correlation value is over a defined threshold, a new packet is detected. This technique works fine, if there are no interferers in the channel.

Another technique is based on the variance of the sub packet correlations. The variance for a discrete finite length can be calculated by $var=1/n*sum((xi-\mu)^2)$. The mean value can be calculated by $\mu=1/n*sum(xi)$. In this case, n is the number of used sub correlations, p the before calculated mean value and xi the correlation result of sub correlation i.

The partly correlation results are normalized to the receive power and to the length of the correlation part. Therefore the correlation result of one sub correlation is between 0 and 1.

If no noise and no interferer to the signal are applied, the correlation of each sub correlation at the perfect time slot yields the same value and no variance between the correlation results of the sub correlations can be observed. The optimal timeslot is in the middle of the autocorrelation function, where the peak has the highest value. In other time slots there is high variance caused by unknown data.

The calculation of the variance is shown as an example for sub packet wise correlation in the following figure.

If there is noise on the channel the variance at the perfect time slot increases with decreasing SNR. The maximum variance can be achieved at the lowest possible SNR, where packets can correct decoded. This value can be used as a threshold. If the calculated variance is below this threshold, a packet is detected.

This threshold can be used standalone for the packet detection or can be used in combination with normal detection as a second stage for decision whether the detection of the first stage was wrong.

Figure 10:
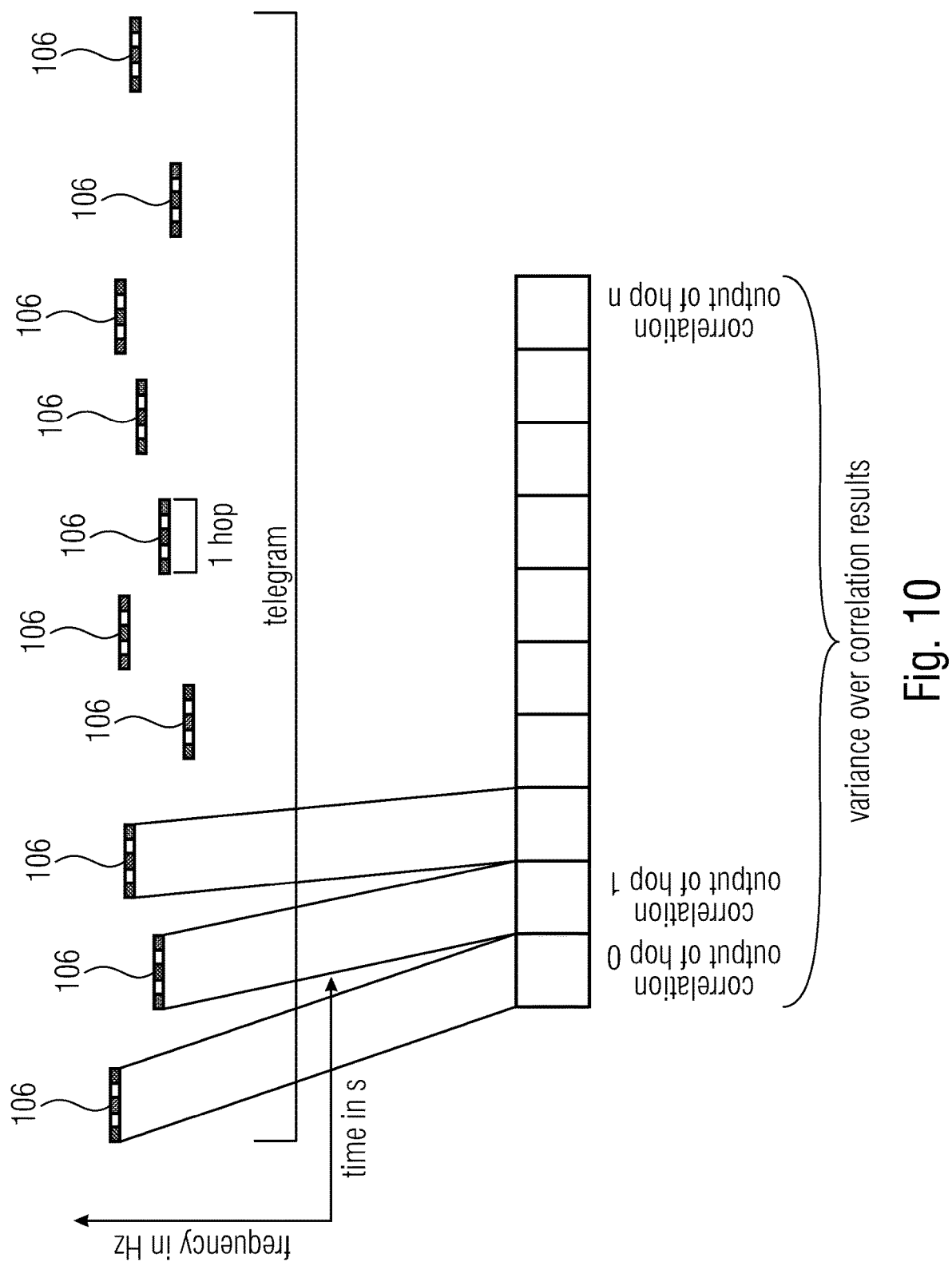
FIG. 10 shows in a diagram a plurality of data packets which are part of a telegram which is transmitted separated into the plurality of data packets over a communication channel together with a schematic view of a calculation of a variance over all (or at least a part of) the data packets, according to an embodiment.

FIG. 10 shows in a diagram a plurality of data packets (or sub-packets, or hops) 106 which are part of a telegram which is transmitted separated into the plurality of data packets 106 over a communication channel and a schematic view of a calculation of a variance over all (or at least a part of) data packets (sub-packets) 106. In FIG. 10, the ordinate describes the frequency and the abscissa the time.

This algorithm can also used to detect side lobes in the correlation, which are not necessarily from interference. For example, they can occur by a non-ideal correlation sequence.

As an example for a two stage detection, first the correlation can be calculated with the normalized symbols. If the first stage detects a packet, the correlation results of all sub correlations in the detected time slot can be used to calculate the variance. If this variance is smaller than the threshold, packet detection can be triggered.

Typically, the threshold of the first stage can be chosen lower than peaks of the side lobes. If a value above the threshold is detected, the variance can be calculated. Only if both values are in the detection range, a new packet can be detected.

The correlation for the whole packet can be split into sub correlations. These sub correlations can be also used if only one correlation sequence is in the whole packet. In this case, the preamble can be split for sub correlations. Over all sub correlations the variance can be calculated and compared to a threshold.

Advantage of this technique is, that in the interfered case the number of false detected packets can reduced. Furthermore the thresholds can reduced, which yields in a better detection rate for low SNRs (SNR=signal-to-noise ratio).

Weighted Synchronization Symbols

Furthermore, the preamble symbols (or pilot symbols) can be weighted before the correlation. There are three different techniques:

weight factors for all sync symbols;
weight factors for each sub-packet 106; and
weight factors for each preamble part, The weighing can also be done after the correlation over a sub-packet or over a part of a correlation sequence. Therefore the partial correlation is done and afterwards multiplied with the weight factor.

As an example the weight factors can be calculated by the variance on the assumed synchronization symbols in the time slot. Or they can be obtained from the power variance of all symbols inside the time slot or based on a determined signal-to-noise ratio.

Before the correlation is done, the weight factors can be applied to the synchronization symbols. Interfered synchronization symbols have lower weight factors, so these symbols have less influence on the correlation result.

Figure 11:
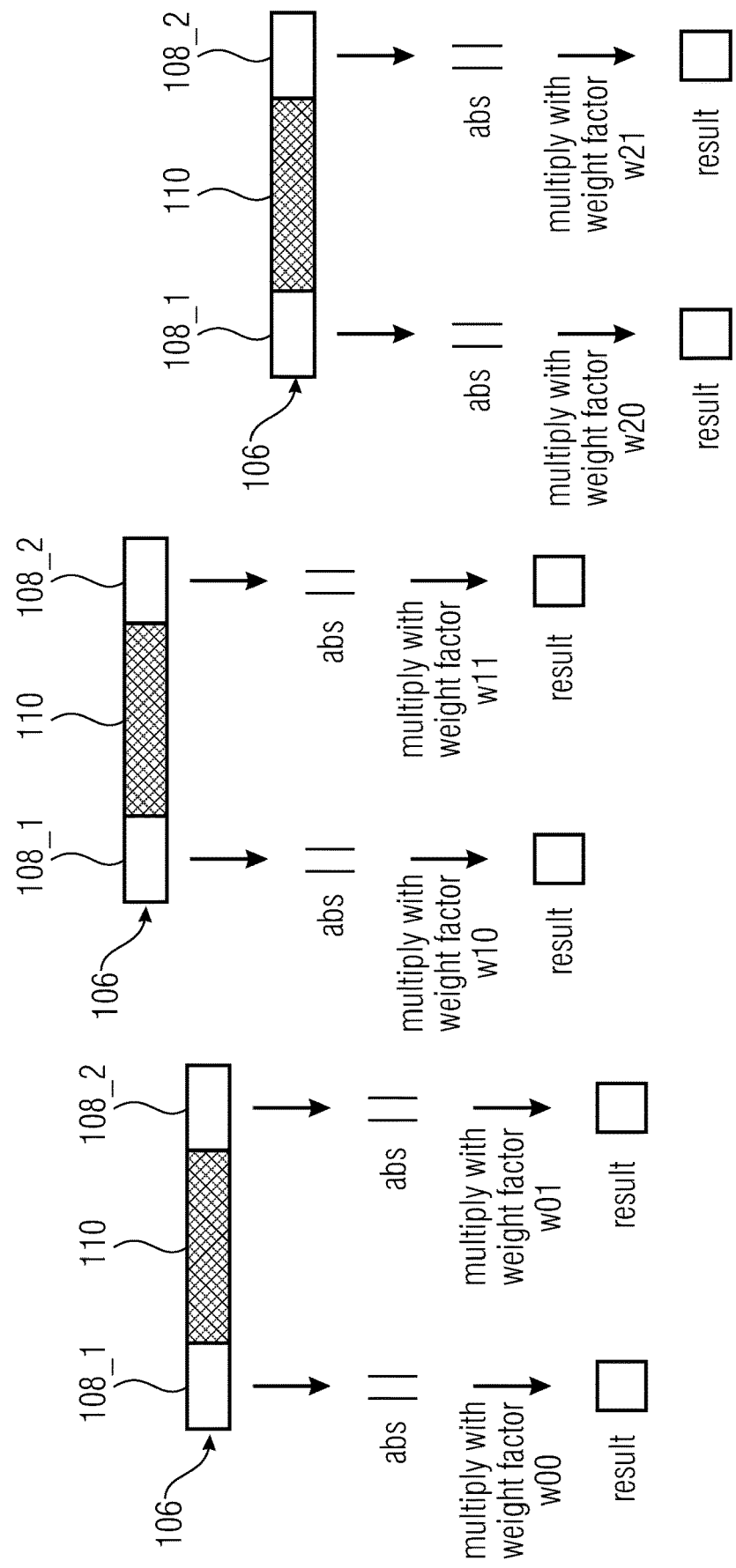
FIG. 11 shows a schematic view of three data packets, each of the data packets having two partial pilot sequences, and of a weighting of the pilot sequences performed by applying individual weighting factor to each of the partial pilot sequences for each data packet, according to an embodiment.

FIG. 11 shows a schematic view of three data packets 106, each of the data packets 106 having two partial pilot sequences 108_1 and 108_2, and of a weighting of the pilot sequences 108_1 and 108_2 performed by applying individual weighting factor to each of the partial pilot sequences 108_1 and 108_2 for each data packet 106.

In other words, FIG. 11 shows this concept for preamble part wise weighting. The factors are multiplied after the summation over the preamble part and the nonlinear operation. If the weighing is done before the correlation, the values in the figure are multiplied with the factors before the calculation of the absolute value is done.

If one only one correlation sequence is used, this sequence can be split into sub sequences. Therefore, every sub-sequence gets an own weight factor.

The synchronization symbols can be multiplied with a weight factor. It's also possible that only preamble parts are weighted instead of symbol wise weighting. The weight factor can be applied before the correlation or after a sub-correlation.

This has the advantage that the number of false detection can be decreased in an interfered channel. Therefore, the power consumption of the receiver can be reduced.

Side Lobe Detection

Caused by the non-ideal correlation sequence, side lobes occur in the correlation output. These side lobes are deterministic and at a specific offset from the main lobe. The receiver can calculate these positions, if the correlation sequence is known (which is very often known in the receiver).

This is shown in the following figure, where the main lobe and two side lobes are shown. These side lobes have a lower peak than the main lobe. To avoid false detections, the threshold is set to be higher than the biggest side lobe peak.

If the threshold is set lower than highest side lobe peak, false detections occur. To avoid this false detection, the receiver search in the known side lobe temporal distance, if a higher peak occurs. If yes, a side lobe is detected and if not the receiver has already found the main lobe.

These side lobes can also occur on different frequency offsets. The receiver gets the side lobes by doing an auto-correlation function on different frequency offsets.

Figure 12:
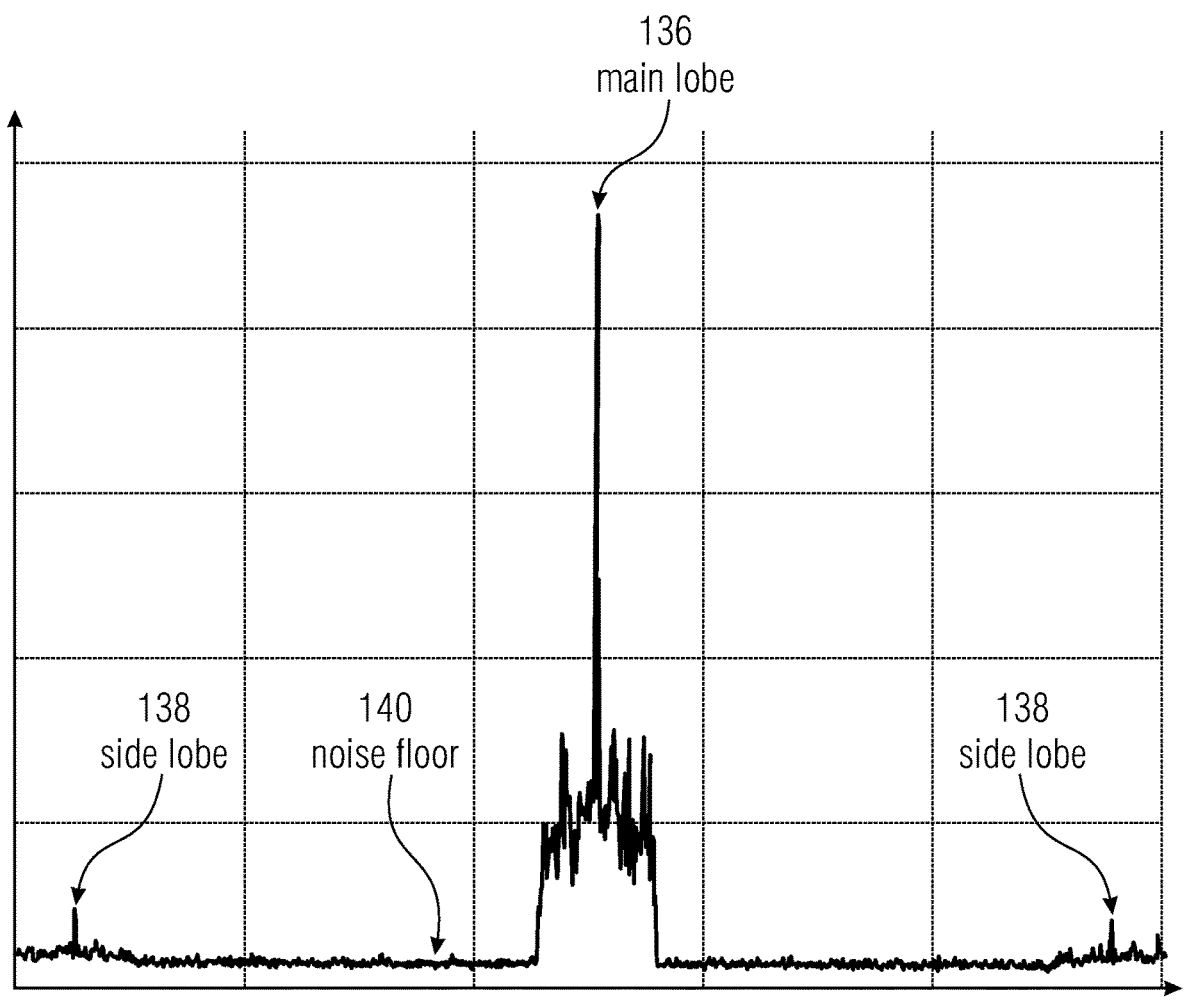
FIG. 12 shows in a diagram an amplitude of a correlation function plotted over time, according to an embodiment.

FIG. 12 shows in a diagram an amplitude of an correlation output plotted over time. In other words, FIG. 12 shows a typical correlation output. On the abscissa the time is plotted and on the ordinate the correlation output is shown. The main lobe 136, two side lobes 138 and noise floor 140 are shown in FIG. 12.

The additional computation power is very low, because the side lobe correlation values are calculated earlier in the correlation and can be saved in a history (or memory).

Side lobe detection can be done. If a value above the threshold is found, the correlation values in side lobe distance are compared to the actual correlation value. If the value in side lobe distance is higher, a side lobe 138 is detected. Otherwise the main lobe 136 is in the actual time slot.

This has the advantage that the threshold for the detection can be set under the highest peak of a side lobe 138. Thereby, an improved detection rate can be achieved even for a low signal-to-noise ratio. The number of false detections can be decreased, compared with the same threshold without side lobe detection.

Detection Window

As previously shown in FIG. 12, there is not an ideal correlation around the main lobe 136. This is caused by non-ideal correlation sequence, by splitting the correlation parts into the data parts and by interference. Therefore, to avoid false detections, the threshold is set over the highest value except the main lobe 136, which yields a bad detection performance in a noisy channel. At decreasing SNR, the value of the correlation results gets lower. Packet detection is only assumed if the correlation value above the defined threshold.

To get better performance against noise, a detection window can be introduced. This window has normally the size of the region before and after the main lobe 136. Instead of triggering new packet detection directly, if a value above the threshold is detected, the highest peak inside the window is searched. The packet detection output can blocked until the index of the highest peak inside the detection window gets a predefined value (detection index). If the correlation value is above the threshold and the Index is exact at the defined value, packet detection can be triggered.

Figure 13:
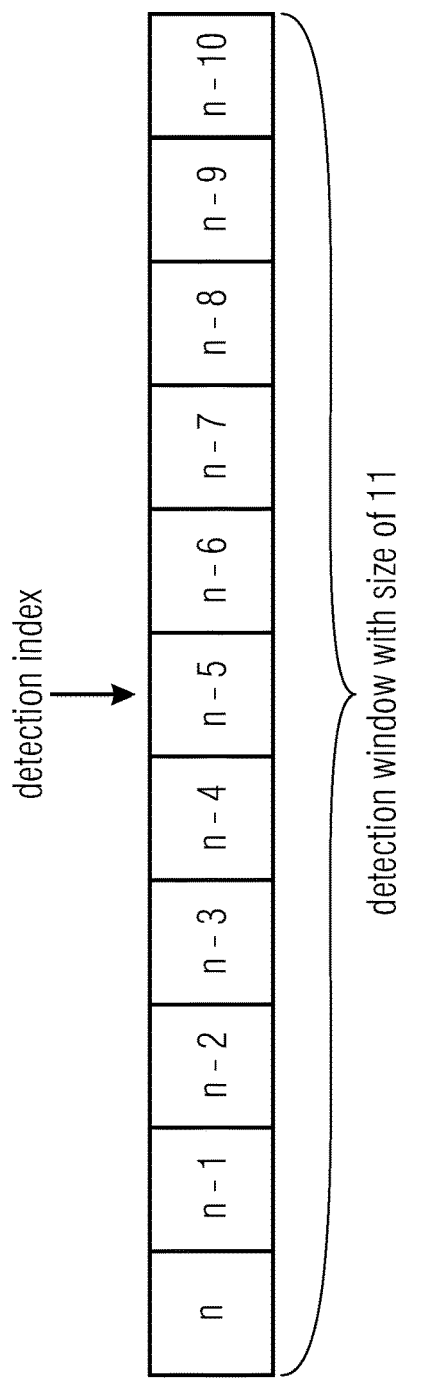
FIG. 13 shows a schematic view of a detection window, according to an embodiment.

FIG. 13 shows such a detection window. In this example it has eleven elements. The detection index can be set of the middle of the window.

Figure 14:
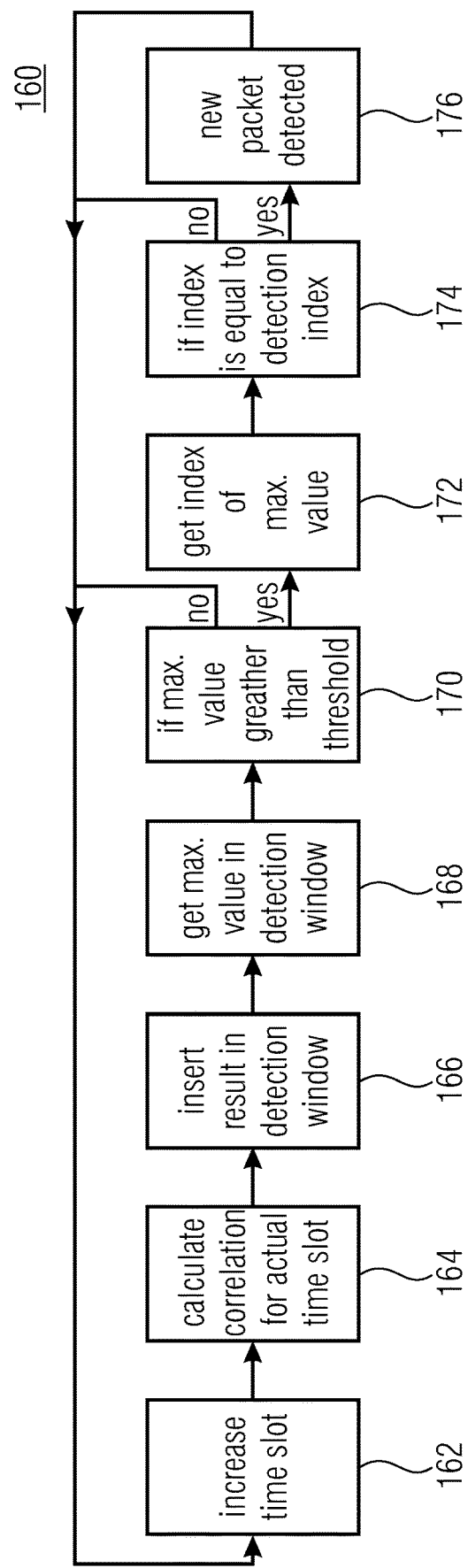
FIG. 14 shows a flow-chart of a method for detecting a data packet using a detection window, according to an embodiment.

FIG. 14 shows a flow-chart of a method 160 for detecting a data packet using a detection window, according to an embodiment. In a first step 162, a time slot (index) can be increased. In a second step 164, the correlation can be calculated for the actual time slot. In a third step 166, the result (of the correlation) can be inserted in the detection window. In a fourth step 168 a maximum value in the detection window can be determined. In a fifth step 170 it can be determined if the maximum value is greater than a threshold. If the maximum value is not greater than the threshold, then first to fifth steps 162 to 170 are repeated. If the maximum value is greater than the threshold, then in a sixth step 172 an index of the maximum value is determined. In a seventh step 174 it is determined whether the index is equal to the detection index. If the index is not equal to the detection index, then first to seventh steps 162 to 174 are repeated. If the index is equal to the detection index, then in an eight step 176 a new packet is detected.

In other words, FIG. 14 shows a schematic how the detection is done. Before the detection is started the window is created and set with initial values (e. g. all values to zero). Afterwards the continuous detection is started.

In the first step 162 the index of the time slot is updated. Afterwards 164 the correlation in the actual time slot is done. For this correlation the above mentioned techniques can be used or all other techniques also work fine. The correlation result is saved in the detection window at the newest time index 166. Therefore, the oldest one is deleted from the array (shift all values by one to the right and insert on the left the new value).

Inside this window the maximum peak is searched 168. If the max peak inside the window is lower than the threshold 170, the process is going back to the first step 162. Otherwise the index of the maximum is extracted 172 and compared to the detection index 174. If both values are the same a new packet is detected 176.

FIG. 15 shows in three diagrams amplitudes of correlation outputs 170 plotted over time for three different time slots as well as the threshold 171 and the detection window 172 used for detecting the data packet, according to an embodiment.

In other words, FIG. 15 shows this method at three different time slots. In the first part a value above the threshold can be detected, which is not at the detection index. If packet detection is done in this slot, false detection occurs.

In the detection window 172 the highest value is obtained. Now it's proved if the highest value inside this window 172 is above the threshold.

This is the case for the first time slot in FIG. 15. But the index of the highest value needs to be exact the detection index, which is not the case for the first case. The index is greater than the detection index, so this peak is in a few steps at the detection index. If it is there, it has to be the highest value inside the window to trigger the packet detection. Until it gets closer to the detection index, other correlation values added to the window. In this example the have higher correlation values, so the index of the maximum value is not equal to the detection index.

In the second case, the highest value is exact at the detection index and the value is above the threshold, packet detection is assumed.

In the last case the maximum value index is below the middle of the window.

If the index of the maximum is higher than the detection index, the time slot is too early for detection, it will be detected later. If the value is lower than the detection index, the packet detection was already triggered before.

A detection window 172 can be introduced. If a value above the threshold 171 is detected, the packet detection is not triggered immediately. Instead, the packet detection can be blocked, until the index of the maximum value inside the detection window 171 reaches the defined detection index.

This has the advantage that the threshold can be set lower, which yields a better detection rate at low SNRs with less false detection rate.

Partly Correlation

Instead of calculating the correlation over all sub-correlations, the correlation can be only done over a part of all correlation sequences. This technique also works, if only one correlation sequence is used. In this case, the correlation sequence can be split into sub parts as described before.

Figure 16:
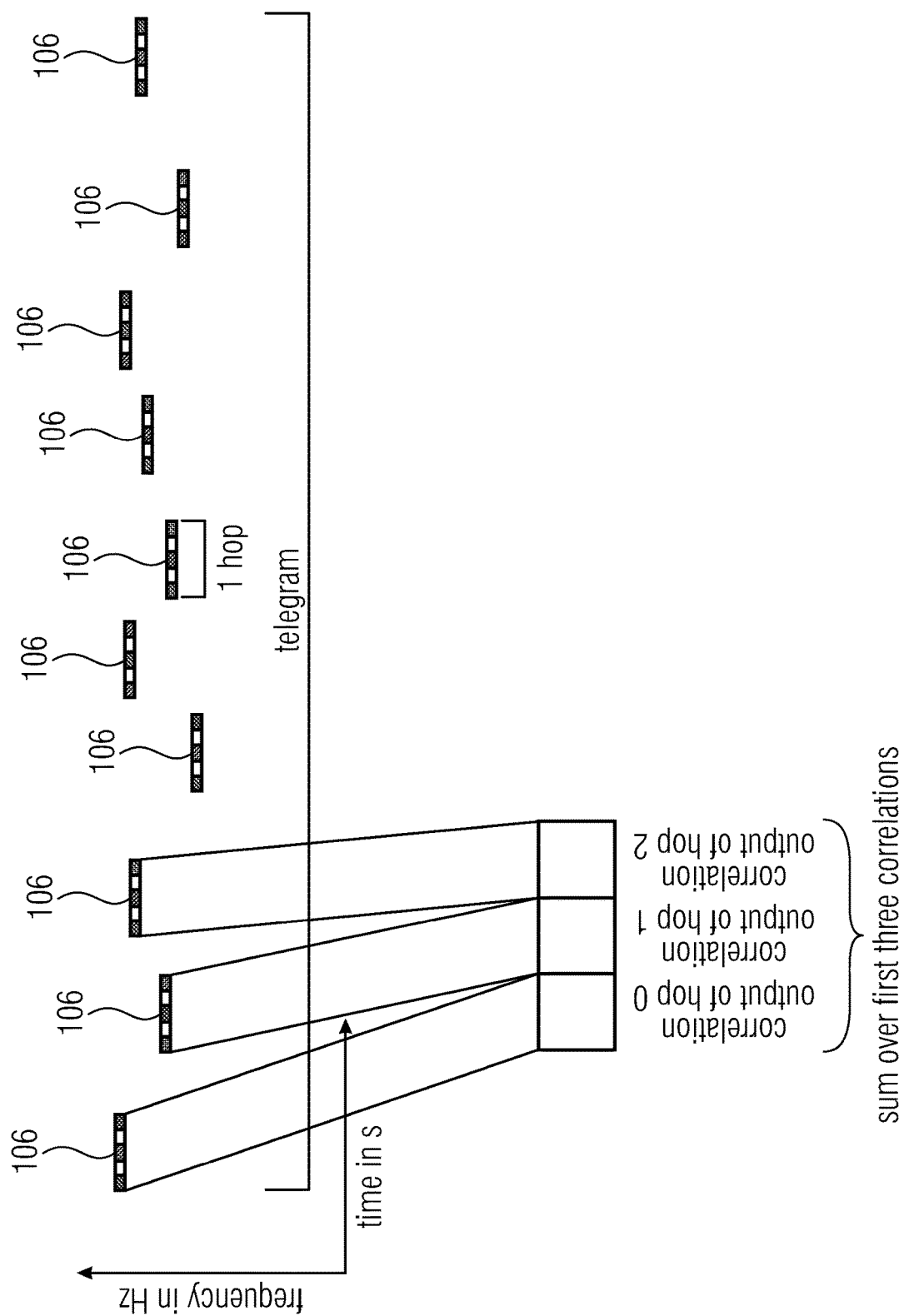
FIG. 16 shows in a diagram a plurality of data packets which are part of a telegram which is transmitted separated into the plurality of data packets over a communication channel and a schematic view of a partly correlation over three of the data packets, according to an embodiment.

FIG. 16 shows in a diagram a plurality of data packets (or sub-packets, or hops) 106 which are part of a telegram which is transmitted separated into the plurality of data packets 106 over a communication channel and a schematic view of a partly correlation over three of the data packets (sub-packets) 106. In FIG. 16, the ordinate describes the frequency and the abscissa the time.

In other words, FIG. 16 gives an example for this technique with sub packet wise correlations. Instead of calculating the correlation over all sub packets, the correlation is done over only three sub packets. Afterwards the sum of the subset yields the correlation output.

The threshold can be adapted to the lower number of sub correlations.

Unfortunately, the minimized correlation sequence has a higher probability for false detection caused by interferer or by noise. In order to get an improved (or even best) performance, a two stage decision can be used. In a first step, the correlation can be done over a subset of correlation sequences. If a packet is detected in the first step, in a second step the correlation can be done over all correlation parts. Only if the second correlation is also above the threshold, packet detection may be triggered.

The correlation output of the first stage can be used for the calculation of the whole correlation. Therefore, the correlation over the remaining correlations sequences is calculated and added to the result of the first stage.

The correlation can be only calculated over a subset of the synchronization sequence. If a packet is detected by this method, a second correlation over all sequences can be done.

This has the advantage that the consumption power of the receiver can be reduced, because the algorithm mustn't calculate the correlation of all parts. Only if the sub correlation detects a packet, the whole correlation is calculated.

Method

Figure 17:
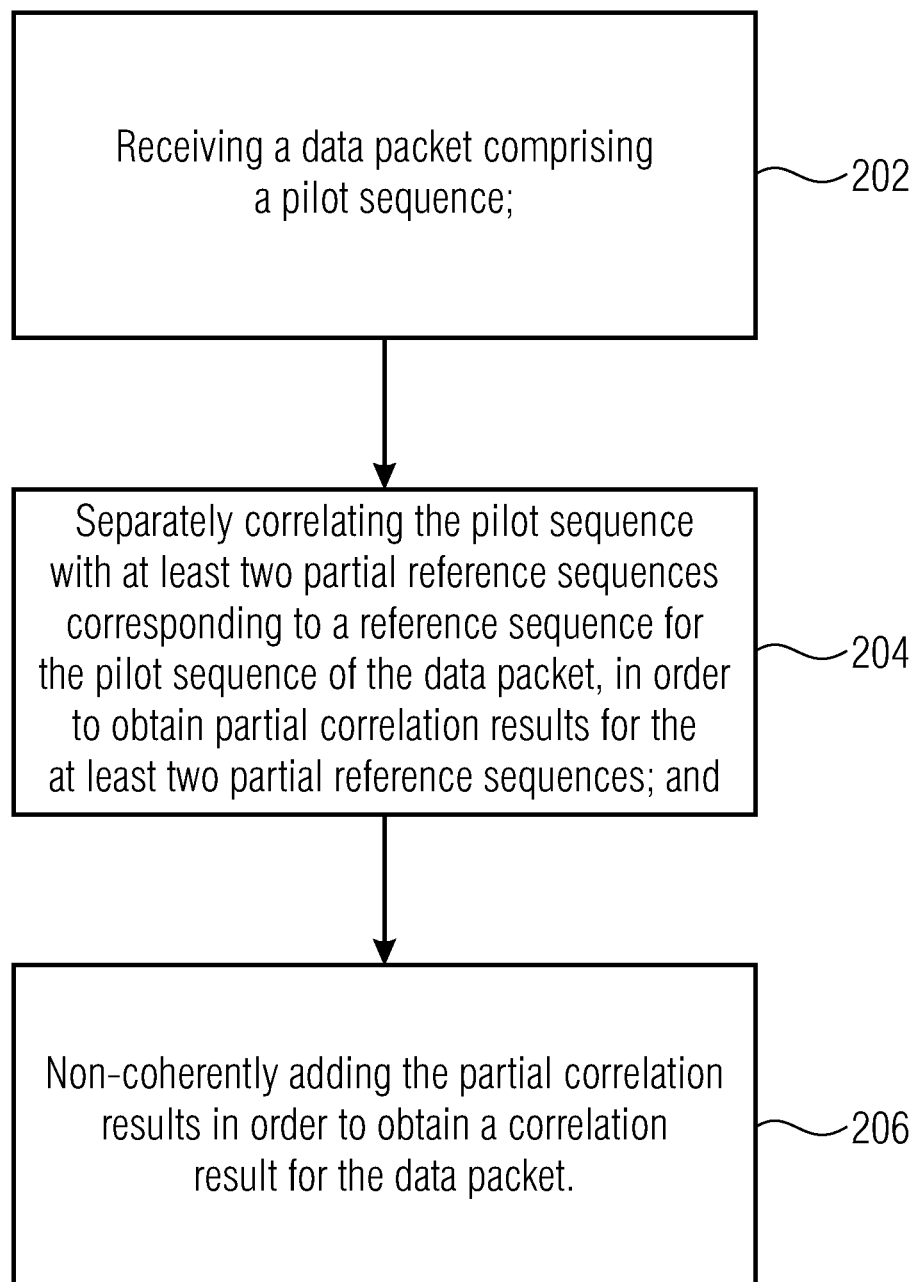
FIG. 17 shows a flowchart of a method for receiving a data packet, according to an embodiment.

FIG. 17 shows a flowchart of a method 200 for receiving a data packet. The method comprises a step 202 of receiving a data packet comprising a pilot sequence; a step 204 of separately correlating the pilot sequence with at least two partial reference sequences corresponding to a reference sequence for the pilot sequence of the data packet, in order to obtain partial correlation results for the at least two partial reference sequences; and a step of non-coherently adding the partial correlation results in order to obtain a correlation result for the data packet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Further Embodiments

Figure 18:
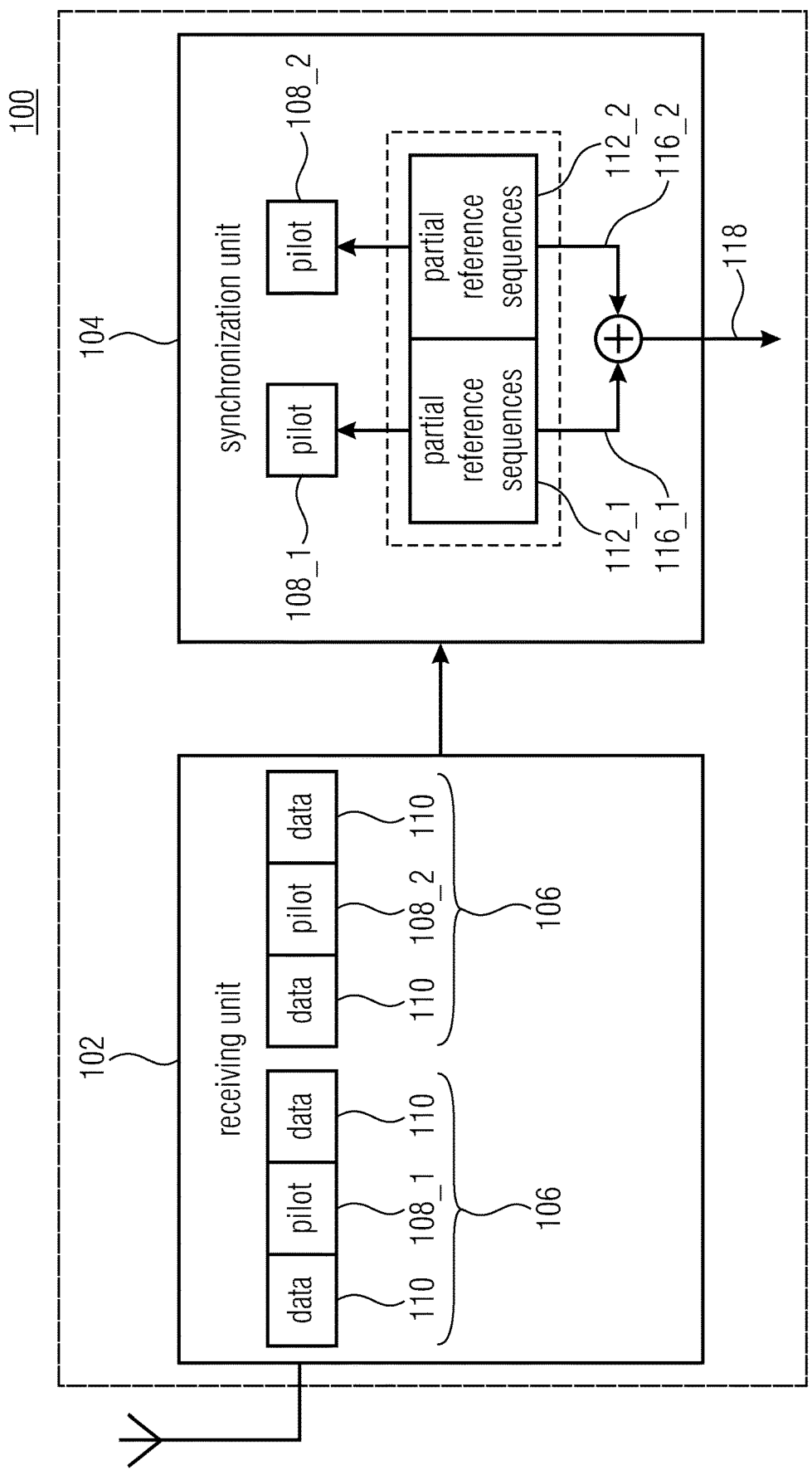
FIG. 18 shows a schematic block diagram of a receiver, according to an embodiment.

FIG. 18 shows a schematic block diagram of a receiver 100 according to an embodiment. The receiver 100 comprises a receiving unit 102 and a synchronization unit 104. The receiving unit 102 is configured to receive data packets 106 (e.g., at least two data packets), at least two of the data packets 106 (e.g., each of the at least two data packets) comprising a partial pilot sequence of at least two partial pilot sequences (note that the receiver may receiver additional data packets not having a partial pilot sequence).

For example, the receiving unit 102 can be configured to receive and demodulate a signal transmitted from a transmitter over a communication channel to the receiver 100, and to provide based thereon a data stream comprising the at least two data packets 106.

A first data packet 106 of the at least two data packets 106 can comprise a first partial pilot sequence 108_1 of the at least two partial pilot sequences 108_1-108_n and a second data packet 106 can comprise a second partial pilot sequence 108_2 of the at least two partial pilot sequences 108_1-108. Further, the at least two data packets 106 can comprise one or more data sequences 110 arranged before or after the partial pilot sequences 108_1 and 2.

The synchronization unit 104 is configured to separately correlate the partial pilot sequences 108_1-108_n with at least two partial reference sequences 112_1-112_n, in order to obtain a partial correlation result 116_1-116_n for each of the at least two partial reference sequences 112_1-112_n, wherein the synchronization unit 104 is configured to non-coherently add the partial correlation results 112_1-112_n in order to obtain a coarse correlation result 118 for the two data packets 106.

For example, the synchronization unit 104 can be configured to correlate the partial pilot sequence 108_1 of the first data packet 106 with the first partial reference sequence 112_1, in order to obtain a partial correlation result 116_1 for the first partial reference sequence 112_1, and to correlate the partial pilot sequence 108_2 of the second data packet 106 with the second partial reference sequence 112_2, in order to obtain a partial correlation result 116_2 for the second partial reference sequence 112_2.

The synchronization unit 104 can be configured to non-coherently add the partial correlation results 116_1-116_n by adding absolute values or squared absolute values or approximated absolute values or any other non-liner operation of the partial correlation results 116_1-116_n.

The at least two partial reference sequences 112_1-112_n can be at least two different parts of a reference sequence 114, wherein the at least two partial pilot sequences 108_1-108_n can be at least two different parts of a pilot sequence 108.

Thus, compared with the embodiments of the receiver 100 described with respect to FIGS. 1 to 16, instead of a data packet 106 comprising at least two partial pilot sequences 108_1-108_n, data packets 106 (e.g., at least two data packets), at least two of the data packets (e.g., each of the at least two data packets) comprising a partial pilot sequence of at least two partial pilot sequences are received. However, the functionality of the synchronization unit 104 is practically the same, i.e., the partial correlation results 112_1-112_n can be non-coherently added in order to obtain the coarse correlation result 118. If at least two further data packets are received, in the same manner, the partial correlation results of the at least two further data packets can be non-coherently added in order to obtain the coarse correlation result for the at least two further data packets. Further, the coarse correlation results for the at least two data packets and the at least two further data packets can be combined to obtain a combined coarse correlation result.

It becomes obvious, that the description of the receiver shown and explained with respect to FIGS. 1 to 16 can also be applied to the receiver shown in FIG. 18, and vice versa.

Figure 19:
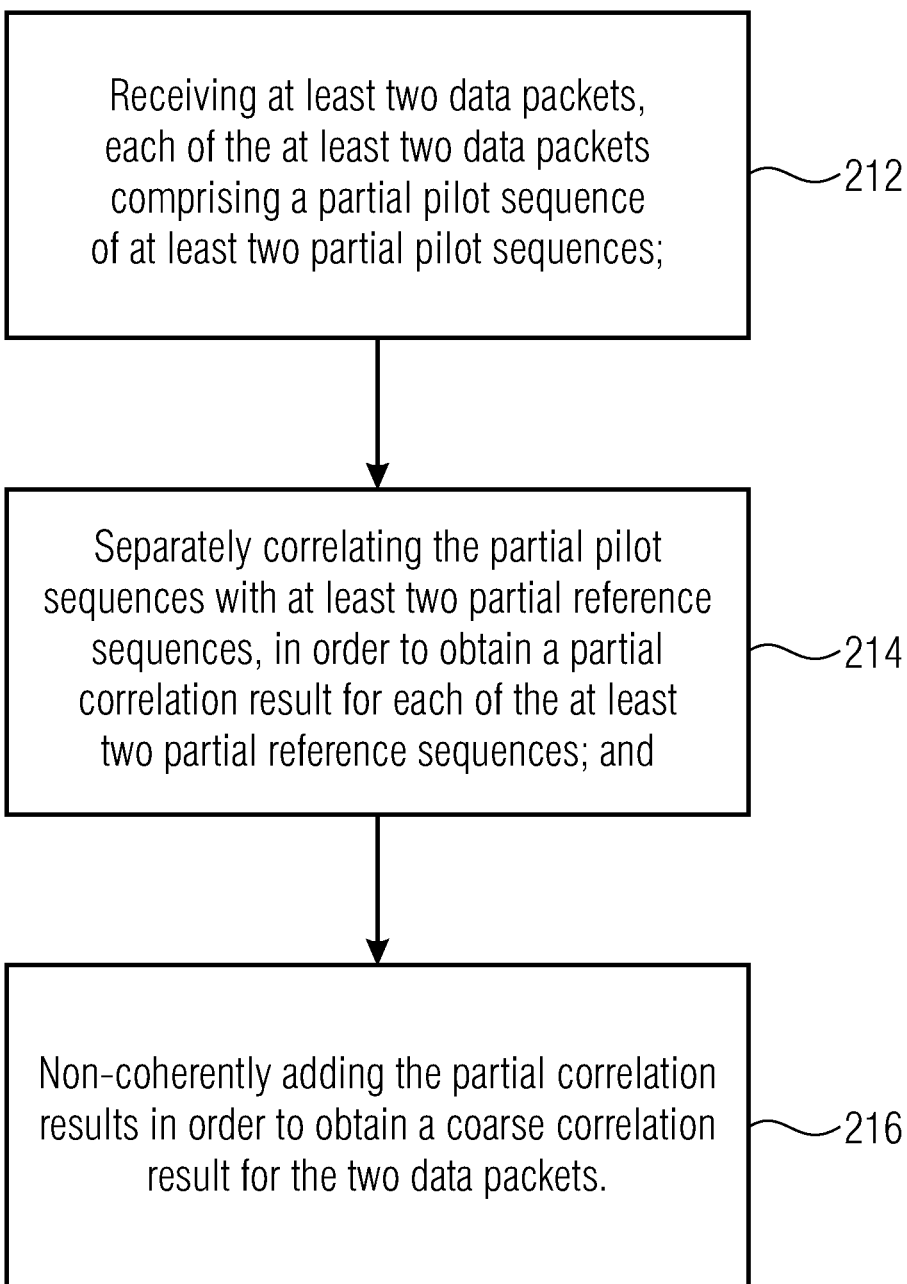
FIG. 19 shows a flowchart of a method for receiving a data packet, according to an embodiment.

FIG. 19 shows a flow-chart of a method 210 for receiving. The method 210 comprises a step of receiving data packets (e.g., at least two data packets), at least two of the data packets (e.g., each of the at least two data packets) comprising a partial pilot sequence of at least two partial pilot sequences; a step 214 of separately correlating the partial pilot sequences with at least two partial reference sequences, in order to obtain a partial correlation result for each of the at least two partial reference sequences; and a step 216 of non-coherently adding the partial correlation results in order to obtain a coarse correlation result for the two data packets.

General

Embodiments can be used for systems for transmitting small amounts of data, for example, sensor data, from a large number of nodes, such as heating, electricity or water meters, to a base station are known. A base station receives (and possibly controls) a large number of nodes. At the base station more computing power and a more complex hardware, i.e. a receiver with higher performance, is available. In the nodes only cheap crystals are available, which generally have a frequency offset of 10 ppm or more. However, embodiments may also be applied to other application scenarios.

Embodiments provide a plurality of optimized preamble (or pilot sequence) splitting's, that improve interferer robustness.

Embodiments provide a correlation method, which is robust against frequency offsets. Thereby, partly correlation is used, which are added afterwards non-coherently. The non-coherent addition of the partial correlations can be used to transmit further information in the preamble, such as length information.

Embodiments provide several methods using which it is possible to perform packet detection with good performance even if the communication channel is disturbed. Some of these methods allow an additional gain with respect to noise.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having Installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A receiver, comprising:
   a receiving unit configured to receive a data packet comprising a pilot sequence;
   a synchronization unit configured to separately correlate the pilot sequence with at least two partial reference sequences, in order to acquire a partial correlation result for each of the at least two partial reference sequences;
   wherein the synchronization unit is configured to non-coherently add the partial correlation results in order to acquire a coarse correlation result for the data packet;
   wherein the receiving unit is configured to receive at least two data packets, wherein each of the at least two data packets comprises a pilot sequence;
   wherein the synchronization unit is configured to separately correlate the pilot sequence of each of the at least two data packets with at least two partial reference sequences corresponding to a reference sequence for the pilot sequence of the corresponding data packet, in order to acquire a partial correlation result for each of the at least two partial reference sequences for each of the at least two data packets;
   wherein the synchronization unit is configured to non-coherently add at least a part of the partial correlation results for each of the at least two data packets in order to acquire a coarse correlation result for each of the at least two data packets;
   wherein the synchronization unit is configured to combine at least a part of the coarse correlation result of the at least two data packets, in order to acquire a combined coarse correlation result.

2. The receiver according to claim 1, wherein the synchronization unit is configured to non-coherently add the partial correlation results by adding absolute values or squared absolute values or approximated absolute values or any other non-linear operation of the partial correlation results.

3. The receiver according to claim 1, wherein the at least two partial reference sequences are at least two different parts of a reference sequence for the pilot sequence of the data packet.

4. The receiver according to claim 1, wherein the data packet comprises at least two partial reference sequences as the reference sequence.

5. The receiver according to claim 1, wherein the synchronization unit is configured to combine the coarse correlation results of the at least two data packets by using a sum or approximations of an ideal Neyman-Pearson detector of the coarse correlation results of the at least two data packets.

6. The receiver according to claim 1, wherein the at least two data packets are parts of a telegram which is transmitted separated into the at least two data packets, wherein the receiver comprises a data packet combining unit configured to combine the at least two data packets in order to acquire the telegram.

7. The receiver according to claim 1, wherein the synchronization unit is further configured to coherently add the partial correlation results in order to acquire a fine correlation result for the data packet.

8. The receiver according to claim 1, wherein, if the combined coarse correlation exceeds a predefined threshold, the synchronization unit is further configured to coherently add the partial correlation results for each of the at least two data packets in order to acquire a fine correlation result for each of the at least two data packets;
   wherein the synchronization unit is configured to combine the fine correlation results of the at least two data packets, in order to acquire a combined fine correlation result.

9. The receiver according to claim 1, wherein the synchronization unit is configured to estimate a frequency offset of the data packet.

10. The receiver according to claim 9, wherein the data packet comprises a header information coded in a phase shift of the pilot sequence;
    wherein the receiver comprises a header extraction unit configured to extract the header information from the data packet by applying a frequency correction to the data packet using the estimated frequency offset and estimating the phase shift of the pilot sequence.

11. The receiver according to claim 1, wherein the synchronization unit is configured to normalize the coarse correlation results of the at least two partial reference sequences and to combine the normalized coarse correlation results of the at least two partial reference sequences, in order to acquire a combined coarse correlation result.

12. The receiver according to claim 1, wherein the synchronization unit is configured to normalize symbols of the pilot sequence to acquire a normalized pilot sequence and to separately correlate the normalized pilot sequences with the at least two partial reference sequences.

13. The receiver according to claim 1, wherein the synchronization unit is configured to calculate a variance of the partial correlation results for the data packet and to detect the data packet if the variance of the partial correlation results for the data packet is smaller than or equal to a predefined threshold.

14. The receiver according to claim 1, wherein the synchronization unit is configured to apply a weight factor to symbols of the data packet, or to apply an individual weight factor to symbols of each of the at least two partial pilot sequences, wherein the data packet comprises at least two partial reference sequences as the reference sequence, or to apply an individual weight factor to each symbol of the at least two partial pilot sequences, wherein the data packet comprises at least two partial reference sequences as the reference sequence.

15. The receiver according to claim 1, wherein the synchronization unit is configured to detect a main lobe and side lobes of the correlation and to provide the detected main lobe as correlation result using known distances between the main lobe and the side lobes.

16. The receiver according to claim 1, wherein the synchronization unit is configured to use a correlation window for detecting the data packet, wherein the data packet is detected by detecting the highest peak of all correlation peaks exceeding a predefined threshold within the correlation window.

17. A receiver, comprising:
a receiving unit configured to receive data packets, at least two of the data packets comprising a partial pilot sequence of at least two partial pilot sequences;
a synchronization unit configured to separately correlate the partial pilot sequences with at least two partial reference sequences, in order to acquire a partial correlation result for each of the at least two partial reference sequences;
wherein the synchronization unit is configured to non-coherently add the partial correlation results in order to acquire a coarse correlation result for the data packets;
wherein the receiving unit is configured to receive further data packets, at least two of the further data packets comprising a partial pilot sequence of at least two partial pilot sequences;
wherein the synchronization unit is configured to separately correlate the partial pilot sequences of the further data packets with at least two partial reference sequences, in order to acquire a partial correlation result for each of the at least two partial reference sequences, wherein the synchronization unit is configured to non-coherently add the partial correlation results for the further data packets in order to acquire a coarse correlation result for the further data packets;
wherein the synchronization unit is configured to combine at least a part of the coarse correlation result of the data packets and the further data packets, in order to acquire a combined coarse correlation result.

18. The receiver according to claim 17, wherein the synchronization unit is configured to non-coherently add the partial correlation results by adding absolute values or squared absolute values or approximated absolute values or any other non-linear operation of the partial correlation results.

19. The receiver according to claim 17, wherein the at least two partial reference sequences are at least two different parts of a reference sequence, and wherein the at least two partial pilot sequences are at least two different parts of a pilot sequence.

20. The receiver according to claim 17, wherein the synchronization unit is configured to combine the coarse correlation results of the data packets and the further data packets by using a sum or approximations of an ideal Neyman-Pearson detector of the coarse correlation results of the data packets and the further data packets.

21. The receiver according to claim 17, wherein the synchronization unit is further configured to coherently add the partial correlation results of the data packets to acquire a fine correlation result for the data packets.

22. The receiver according to claim 17, wherein, if the combined coarse correlation result exceeds a predefined threshold, the synchronization unit is further configured to coherently add the partial correlation results of the data packets to acquire a fine correlation result for the data packets, and to coherently add the partial correlation results of the further data packets to acquire a fine correlation result for the further data packets;
wherein the synchronization unit is configured to combine the fine correlation results of the data packets and the further data packets, in order to acquire a combined fine correlation result.

23. The receiver according to claim 17, wherein the synchronization unit is configured to normalize symbols of the partial pilot sequences to acquire normalized partial pilot sequences and to separately correlate the normalized partial pilot sequences with the corresponding partial reference sequences.

24. The receiver according to claim 17, wherein the synchronization unit is configured to calculate a variance of the partial correlation results and to detect the data packets if the variance of the partial correlation results for the data packets is smaller than or equal to a predefined threshold.

25. The receiver according to claim 17, wherein the synchronization unit is configured to apply a weight factor to symbols of the data packets, or to apply an individual weight factor to symbols of each of the at least two partial pilot sequences, or to apply an individual weight factor to each symbol of the at least two partial pilot sequences.

26. The receiver according to claim 17, wherein the synchronization unit is configured to detect a main lobe and side lobes of the correlation and to provide the detected main lobe as correlation result using known distances between the main lobe and the side lobes.

27. The receiver according to claim 17, wherein the synchronization unit is configured to use a correlation window for detecting the data packets, wherein the data packets are detected by detecting the highest peak of all correlation peaks exceeding a predefined threshold within the correlation window.

28. A method, comprising:
receiving a data packet comprising a pilot sequence;
separately correlating the pilot sequence with at least two partial reference sequences corresponding to a reference sequence for the pilot sequence of the data packet, in order to acquire partial correlation results for the at least two partial reference sequences; and
non-coherently adding the partial correlation results in order to acquire a correlation result for the data packet;

wherein receiving comprises receiving at least two data packets, wherein each of the at least two data packets comprises a pilot sequence;
wherein separately correlating comprises separately correlating the pilot sequence of each of the at least two data packets with at least two partial reference sequences corresponding to a reference sequence for the pilot sequence of the corresponding data packet, in order to acquire a partial correlation result for each of the at least two partial reference sequences for each of the at least two data packets;
wherein non-coherently adding comprises non-coherently adding at least a part of the partial correlation results for each of the at least two data packets in order to acquire a coarse correlation result for each of the at least two data packets;
wherein the method further comprises combining at least a part of the coarse correlation result of the at least two data packets, in order to acquire a combined coarse correlation result.

29. A method, comprising:
receiving data packets, at least two of the data packets comprising a partial pilot sequence of at least two partial pilot sequences;
separately correlating the partial pilot sequences with at least two partial reference sequences, in order to acquire a partial correlation result for each of the at least two partial reference sequences; and
non-coherently adding the partial correlation results in order to acquire a coarse correlation result for the data packets;
wherein receiving comprises receiving further data packets, at least two of the further data packets comprising a partial pilot sequence of at least two partial pilot sequences;
wherein separately correlating comprises separately correlating the partial pilot sequences of the further data packets with at least two partial reference sequences, in order to acquire a partial correlation result for each of the at least two partial reference sequences, wherein the synchronization unit is configured to non-coherently add the partial correlation results for the further data packets in order to acquire a coarse correlation result for the further data packets;
wherein the method further comprises combining at least a part of the coarse correlation result of the data packets and the further data packets, in order to acquire a combined coarse correlation result.

30. A non-transitory digital storage medium having stored thereon a computer program for performing a method comprising:
receiving a data packet comprising a pilot sequence;
separately correlating the pilot sequence with at least two partial reference sequences corresponding to a reference sequence for the pilot sequence of the data packet, in order to acquire partial correlation results for the at least two partial reference sequences; and
non-coherently adding the partial correlation results in order to acquire a correlation result for the data packet;
wherein receiving comprises receiving at least two data packets, wherein each of the at least two data packets comprises a pilot sequence;
wherein separately correlating comprises separately correlating the pilot sequence of each of the at least two data packets with at least two partial reference sequences corresponding to a reference sequence for the pilot sequence of the corresponding data packet, in order to acquire a partial correlation result for each of the at least two partial reference sequences for each of the at least two data packets;
wherein non-coherently adding comprises non-coherently adding at least a part of the partial correlation results for each of the at least two data packets in order to acquire a coarse correlation result for each of the at least two data packets;
wherein the method further comprises combining at least a part of the coarse correlation result of the at least two data packets, in order to acquire a combined coarse correlation result,
when said computer program is run by a computer.

31. A non-transitory digital storage medium having stored thereon a computer program for performing a method comprising:
receiving data packets, at least two of the data packets comprising a partial pilot sequence of at least two partial pilot sequences;
separately correlating the partial pilot sequences with at least two partial reference sequences, in order to acquire a partial correlation result for each of the at least two partial reference sequences; and
non-coherently adding the partial correlation results in order to acquire a coarse correlation result for the data packets;
wherein receiving comprises receiving further data packets, at least two of the further data packets comprising a partial pilot sequence of at least two partial pilot sequences;
wherein separately correlating comprises separately correlating the partial pilot sequences of the further data packets with at least two partial reference sequences, in order to acquire a partial correlation result for each of the at least two partial reference sequences, wherein the synchronization unit is configured to non-coherently add the partial correlation results for the further data packets in order to acquire a coarse correlation result for the further data packets;
wherein the method further comprises combining at least a part of the coarse correlation result of the data packets and the further data packets, in order to acquire a combined coarse correlation result,
when said computer program is run by a computer.

* * * * *